US007956721B2

(12) United States Patent
Mamaloukas

(10) Patent No.: US 7,956,721 B2
(45) **Date of Patent: *Jun. 7, 2011**

(54) POWER CONSERVING MOBILE TRANSMITTER

(75) Inventor: Jason L. Mamaloukas, Milton, FL (US)

(73) Assignee: Homerun Holdings Corporation, Pensacola, FL (US)

( * ) Notice: Subject to any disclaimer, the term of this patent is extended or adjusted under 35 U.S.C. 154(b) by 1019 days.

This patent is subject to a terminal disclaimer.

(21) Appl. No.: 11/651,277

(22) Filed: Jan. 9, 2007

(65) Prior Publication Data

US 2008/0164973 A1 Jul. 10, 2008

(51) Int. Cl.
*G06F 7/00* (2006.01)

(52) U.S. Cl. ...... 340/5.71; 340/5.7; 340/5.72; 340/5.61; 340/5.64

(58) Field of Classification Search .................. 340/5.7, 340/5.72, 5.71, 5.61, 5.64
See application file for complete search history.

(56) References Cited

U.S. PATENT DOCUMENTS

| | | | | |
|---|---|---|---|---|
| 4,492,111 | A | 1/1985 | Kirkland | 73/84 |
| 4,988,992 | A * | 1/1991 | Heitschel et al. | 340/825.69 |
| 5,412,297 | A | 5/1995 | Clark et al. | 318/468 |
| 5,515,032 | A * | 5/1996 | Johnson | 340/571 |
| 5,596,840 | A | 1/1997 | Teich | 49/26 |
| 5,625,980 | A | 5/1997 | Teich et al. | 49/26 |
| 5,699,055 | A | 12/1997 | Dykema et al. | 340/825.22 |
| 5,940,007 | A * | 8/1999 | Brinkmeyer et al. | 340/825.69 |
| 6,028,537 | A | 2/2000 | Suman et al. | 340/988 |
| 6,271,765 | B1 | 8/2001 | King et al. | 340/825.69 |
| 6,509,825 | B1 * | 1/2003 | Smit et al. | 340/5.2 |
| 6,542,076 | B1 | 4/2003 | Joao | 340/539 |
| 6,634,408 | B2 | 10/2003 | Mays | 160/188 |
| 6,662,123 | B2 * | 12/2003 | Maeckel et al. | 702/60 |
| 6,667,684 | B1 * | 12/2003 | Waggamon et al. | 340/5.71 |
| 6,941,206 | B2 * | 9/2005 | Hasegawa et al. | 701/38 |
| 6,993,134 | B1 * | 1/2006 | Epstein | 380/262 |
| 7,065,891 | B2 * | 6/2006 | Campbell et al. | 33/356 |
| 7,091,688 | B2 * | 8/2006 | Gioia et al. | 318/466 |
| 7,215,238 | B2 * | 5/2007 | Buck et al. | 340/5.23 |
| 7,327,108 | B2 * | 2/2008 | Mullet et al. | 318/280 |
| 7,424,388 | B2 * | 9/2008 | Sato | 702/152 |
| 7,635,960 | B2 * | 12/2009 | Mullet et al. | 318/280 |
| 7,796,035 | B2 * | 9/2010 | Hallbert et al. | 340/568.1 |
| 2003/0033540 | A1 | 2/2003 | Fitzgibbon | 713/200 |
| 2004/0012483 | A1 | 1/2004 | Mays | 340/5.71 |
| 2004/0155777 | A1 * | 8/2004 | Mitchell et al. | 340/568.1 |
| 2004/0239482 | A1 | 12/2004 | Fitzgibbon | 340/5.61 |
| 2006/0077035 | A1 | 4/2006 | Mamaloukas | 340/5.61 |
| 2008/0088412 | A1 * | 4/2008 | Cromer et al. | 340/5.64 |

FOREIGN PATENT DOCUMENTS

| | | |
|---|---|---|
| EP | 1 447 775 | 8/2004 |
| GB | 2 351 171 | 12/2000 |
| WO | WO 2006/015418 | 2/2006 |

* cited by examiner

*Primary Examiner* — Daniel Wu
*Assistant Examiner* — Ryan W Sherwin
(74) *Attorney, Agent, or Firm* — Renner Kenner Greive Bobak Taylor & Weber

(57) ABSTRACT

An operator system and related methods for automatically controlling access barriers which include a base controller associated with at least one access barrier and at least one base receiver associated with the base controller. The system also includes a mobile transmitter configured to be carried by a carrying device, such as a vehicle. The mobile transmitter automatically and periodically generates a mobile signal received by the base receiver. The base controller selectively generates barrier movement commands upon receipt of the at least one mobile signal. Furthermore, the mobile transmitter includes an accelerometer to detect when the carrying device is moving so as to selectively turn the mobile transmitter on and off in order to conserver power.

10 Claims, 14 Drawing Sheets

POWER CONSERVING MOBILE TRANSMITTER

TECHNICAL FIELD

Generally, the present invention relates to an access barrier control system, such as a garage door operator system for use on a closure member moveable relative to a fixed member and methods for programming and using the same. More particularly, the present invention relates to the use of a mobile transmitter maintained in a carrying device, such as an automobile, to initiate the opening and closing of an access barrier depending upon the position of the carrying device relative to the access barrier. Specifically, the present invention relates to a mobile transmitter having a motion detector such as an accelerometer to determine the operational status of the carrying device, so as to selectively turn the mobile transmitter on and off in order to conserve power used to operate the mobile transmitter.

BACKGROUND

When constructing a home or a facility, it is well known to provide access barriers, such as garage doors, which utilize a motor to provide opening and closing movements of the door. Motors may also be coupled with other types of movable access barriers such as gates, windows, retractable overhangs and the like. An operator is employed to control the motor and related functions with respect to the door. In order to open and close the door, the operator is configured to receive command input signals from a wireless portable remote transmitter, a wired or wireless wall station, a keyless entry device or other similar device. It is also known to provide safety devices that are connected to the operator for the purpose of detecting an obstruction so that the operator may then take corrective action with the motor to avoid entrapment of the obstruction.

To assist in moving the garage door or movable barrier between limit positions, it is well known to use a remote radio frequency (RF) or infrared transmitter to actuate the motor and move the door in the desired direction. These remote devices allow for users to open and close garage doors without getting out of their car. These remote devices may also be provided with additional features such as the ability to control multiple doors, lights associated with the operators, and other security features. As is well documented in the art, the remote devices and operators may be provided with encrypted codes that change after every operation cycle so as to make it virtually impossible to "steal" a code and use it at a later time for illegal purposes. An operation cycle may include opening and closing of the barrier, turning on and off a light that is connected to the operator and so on.

Although remote transmitters and like devices are convenient and work well, the remote transmitters sometimes become lost, misplaced or broken. In particular, the switch mechanism of the remote device typically becomes worn after a period of time and requires replacement. To overcome this disadvantage, "hands-free" operation of the remote transmitter has been developed in a number of different forms. Generally, "hands-free" means that a user is not required to initiate physical contact with the transmitter or switch to cause some other physical activity, such as movement of a garage door. Such prior art hands-free systems comprise a mobile transmitter that communicates, via various mobile signals, with a base operator that is configured to actuate an access barrier, such as a garage door, between open and closed positions. In some hands-free systems, only the mobile transmitter may generate signals that are received and acted upon by the base operator. In any event, the mobile transmitter is generally carried by a carrying device, such as a vehicle. During operation, the mobile transmitter is configured to transmit mobile signals to the base operator so as to move the access barrier between open and closed positions, depending on the relative position of the carrying device to the base operator and other criteria. Because the operation of the hands-free system requires mobile signals to be generated by the mobile transmitter for a period of time following the activation and deactivation of the carrying device, the hands-free system, in one aspect, sends the mobile signals continuously at all times. However, to increase the convenience of the system, prior art systems contemplated the utilization of an activity sensor that comprises a vibration or noise detection sensor, which monitors when the vehicle that carries the mobile transmitter is started or turned off. By monitoring such phenomena, the activity sensor is able to selectively turn the mobile transmitter on and off in the hope of conserving the battery power used to operate the mobile transmitter. However, such sensors are expensive and susceptible to becoming active by proximity to other noises or vibrations not associated with the carrying device.

One possible solution to conserving battery power is disclosed in U.S. patent application Ser. No. 10/962,224, assigned to the assignee of the present application and incorporated herein by reference. The '224 application discloses a specific embodiment wherein the mobile transmitter is directly connected to the ignition system and power source of the carrying device. However, such an embodiment requires a specialized installation and does not permit easy transfer of the transmitter between carrying devices. And the known hands-free devices all require periodic transmission of a radio frequency signal from the garage door operator. It is believed that this may lead to increased electrical "noise" pollution, which adversely affects nearby electrical communication devices.

In any event, current activity sensors used by the mobile transmitter may be inadvertently triggered by external phenomena other than that generated by the carrying device, such as a vehicle, that is carrying the mobile transmitter. For example, the vibration generated from the acoustic sound waves from a vehicle's sound system may be sufficient to trigger vibration sensors that comprise the activity sensors that comprise the activity sensors. Additionally, because of the significant amount of electrical leakage and electromagnetic interference (EMI) generated by all electronic devices, the potential is also great that the noise sensor may also be inadvertently triggered, thus causing the power supply of the mobile transmitter to be prematurely drained. Furthermore, mobile transmitters that continuously transmit mobile signals tend to rapidly exhaust their power capacity, thus necessitating the frequent and inconvenient change of batteries or recharge thereof.

Therefore, there is a need in the art for a system that automatically moves access barriers depending upon the proximity of a device carrying a remote mobile transmitter, wherein the transmitter automatically emits somewhat periodic signals that are received by the operator, which then moves the barrier and ignores subsequent transmitter signals for a predetermined period of time. Additionally, there is a need for a mobile transmitter that utilizes a motion detector such as an accelerometer that is not adversely affected by vibration or noise. In addition, there is a need for a mobile transmitter that utilizes a motion detector to detect when the carrying device is accelerating or decelerating. Furthermore, there is a need for a mobile transmitter that utilizes a 1-, 2-, or 3-axis accelerometer to ascertain when the carrying device is moving in at least one axis of motion.

SUMMARY OF THE INVENTION

In light of the foregoing, it is a first aspect of the present invention to provide a power conserving mobile transmitter.

It is another aspect of the present invention to provide a system for controlling an access barrier comprising a base operator to actuate the access barrier, the base operator adapted to communicate learning data only in a learn mode and receive operational data only when in an operate mode, at least one mobile transmitter including a motion detector and a transceiver, the transceiver adapted to communicate learning data only when in the learn mode and transmit operational data only when in the operate mode, the at least one mobile transmitter and the base operator being learned to each other by exchanging learning data, thereby enabling the at least one mobile transmitter to actuate the base operator when the motion detector detects movement and is in the operate mode.

Yet another aspect of the present invention is to provide an operator system for automatically controlling access barriers, comprising a base controller associated with at least one access barrier, at least one base transceiver associated with the base controller, and at least one mobile transmitter including a motion detector and a transceiver, the at least one mobile transmitter generating at least one mobile signal for receipt by the base controller when the motion detector detects movement, the base controller configured to receive the mobile signal and the base controller and the at least one mobile transmitter adapted to exchange learning data between each other in a learn mode, so as to be learned to each other, and wherein if the at least one mobile transmitter and the base controller are learned to each other, the mobile signal is detectable by the at least one base receiver, the base controller selectively generating barrier movement commands depending upon whether the at least one mobile signal is received or not.

Still another aspect of the present invention is a method of detecting movement of a carrying device comprising providing a mobile transmitter that is by default in a low-power consumption mode, the mobile transmitter having an accelerometer that monitors movements in at least one axis of movement, determining whether movement along at least one axis of movement is changing, activating the mobile transmitter out of the low-power consumption mode if movement along the at least one axis of movement is changing.

Yet another aspect of the present invention is to provide a mobile transmitter, comprising a power supply, an activity sensor connected to the power supply, the activity sensor detecting motion thereof and generating a detection signal, and an emitter connected to the power supply, the emitter generating a mobile signal upon generation of the detection signal.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
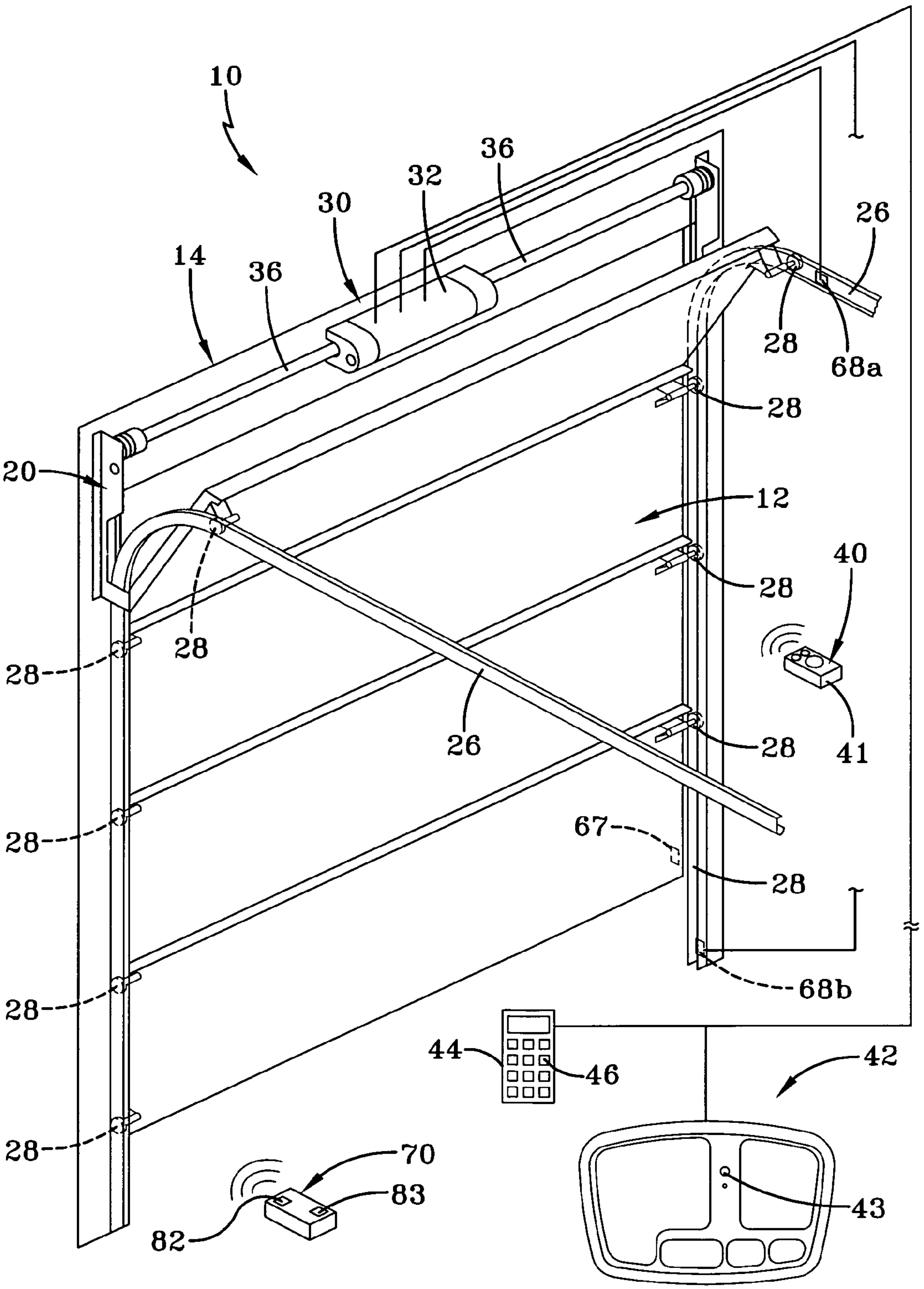
FIG. 1 is a perspective view depicting a sectional garage door and showing an operating mechanism embodying the concepts of the present invention.

A system, such as a garage door operator system which incorporates the concepts of the present invention, is generally designated by the numeral 10 in FIG. 1. Although the present discussion is specifically related to an access barrier such as a garage door, it will be appreciated that the teachings of the present invention are applicable to other types of barriers. The teachings of the present invention are equally applicable to other types of movable barriers such as single panel doors, gates, windows, retractable overhangs and any device that at least partially encloses or restricts access to an area. Moreover, the teachings of the present invention are applicable to locks or an automated control of any device based upon an operational status, position, or change in position of a proximity or triggering device. Indeed, it is envisioned that the present teachings could be used as a remote keyless entry for automobiles, houses, buildings and the like. The disclosed system could be used in any scenario where an object (such as a garage door controlled by an operator) changes state or condition (open/close, on/off, etc.) based upon a position (away/home) or change in position (approaching/leaving) of a second object, such as a mobile transmitter, with respect to the first object.

The discussion of the system 10 is presented in three subject matter areas: the operator; the hands-free mobile transmitter; and operation of the mobile transmitter with the operator. The discussion of the operator presents aspects commonly found in a garage door operator, and which enable features provided by the mobile transmitter. The structural aspects of the mobile transmitter include a discussion of an activity sensor, in the form of an accelerometer, utilized by the transmitter; and the ability of the mobile transmitter to be actuated manually. Finally, the discussion of the operation of the mobile transmitter and the operator provides two different operational scenarios. The first scenario relates to the use of dual transmitter signals; and a second scenario provides an alternative mobile transmitter which is more easily learned to the garage door operator while incorporating any or all of the benefits associated with the other scenario.

I. Operator

The system 10 may be employed in conjunction with a conventional sectional garage door or other movable barrier generally indicated by the numeral 12 as shown in FIG. 1 of the drawings. The opening in which the door 12 is positioned for opening and closing movements relative thereto is surrounded by a frame generally indicated by the numeral 14. A track 26 extends from each side of the door frame and receives a roller 28 which extends from the top edge of each door section. A counterbalancing system generally indicated by the numeral 30 may be employed to balance the weight of the garage door 12 when moving between open and close positions or conditions. One example of a counterbalancing system is disclosed in U.S. Pat. No. 5,419,010, which is incorporated herein by reference.

Figure 2:
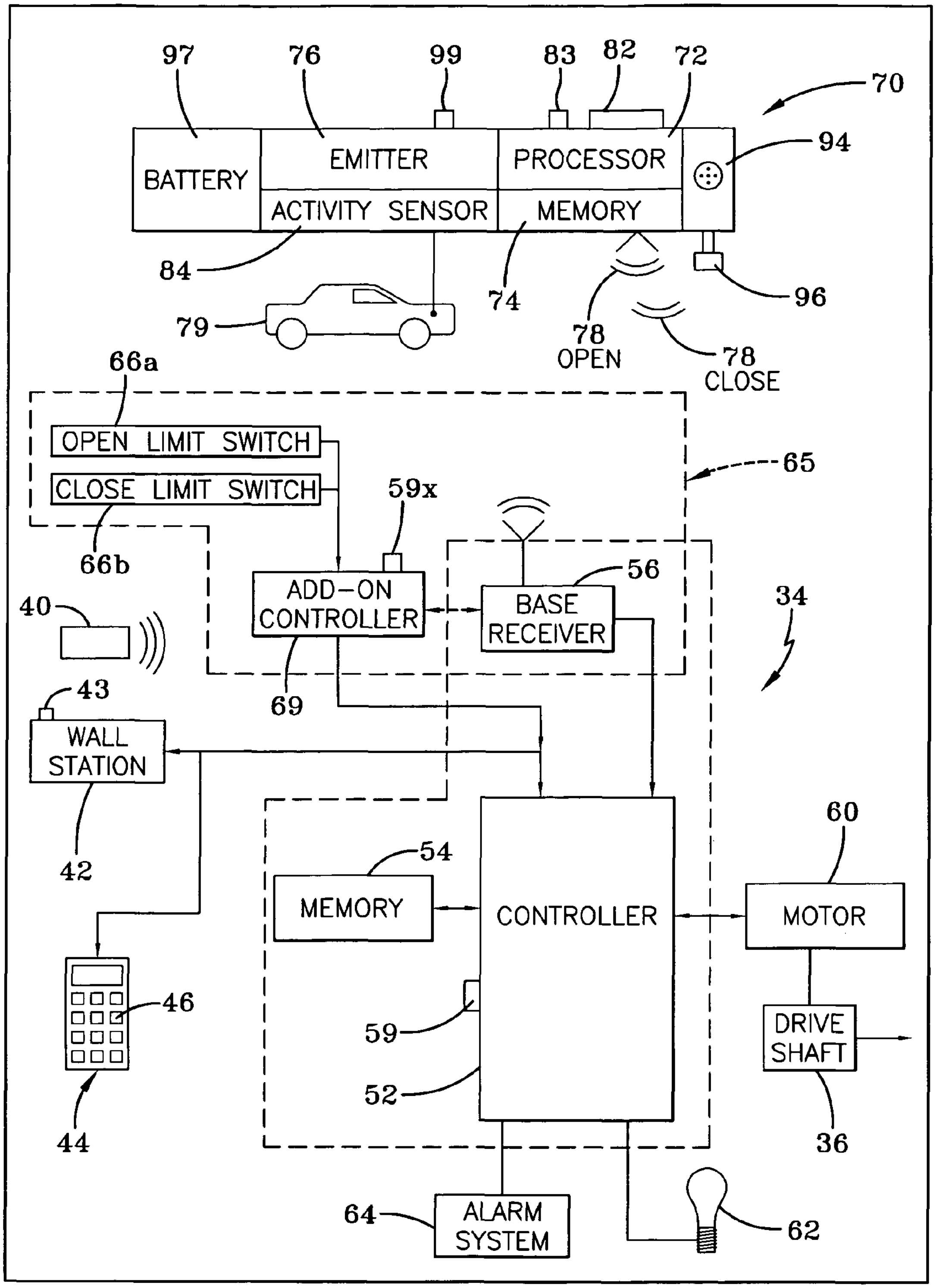
FIG. 2 is a block diagram of an operator system with a mobile remote transmitter according to the present invention.

An operator housing 32, which is affixed to the frame 14, carries a base operator 34 shown in FIG. 2. Extending through the operator housing 32 is a drive shaft 36 which is coupled to the door 12 by cables or other commonly known linkage mechanisms. Although a header-mounted operator is disclosed, the control features to be discussed are equally applicable to other types of operators used with movable barriers. For example, the control routines can be easily incorporated into trolley type, screwdrive and jackshaft operators used to move garage doors or other types of access barriers. In any event, the drive shaft 36 transmits the necessary mechanical power to transfer the garage door 12 between closed and open positions. In the housing 32, the drive shaft 36 is coupled to a drive gear wherein the drive gear is coupled to a motor in a manner known in the art. The control features disclosed are also applicable to any type of actuation system which changes states or condition (open/close, on/off, etc.) based upon a position of an actuation device (docked/away, approaching/leaving, etc.) with respect to the actuation system.

Briefly, the base operator 34 may be controlled by a wireless remote transmitter 40, which has a housing 41, or a wall station control 42 that is wired directly to the system 10 or which may communicate to the base operator 34 via radio frequency or infrared signals. The remote transmitter 40 requires actuation of a button to initiate movement of the barrier between positions. The wall station control 42 is likely to have additional operational features not present in the remote transmitter 40. The wall station control 42 is carried by a housing which has a plurality of buttons thereon. Each of the buttons, upon actuation, provide a particular command to the operator to initiate activity such as the opening/closing of the barrier, turning lights on and off and the like. An install/profile door motion button 43, which may be recessed and preferably actuated only with a special tool, allows for programming of the base operator 34 for association with remote transmitters and more importantly with a hands-free mobile transmitter as will become apparent as the description proceeds. The system 10 may also be controlled by a keyless alphanumeric device 44. The device 44 includes a plurality of keys 46 with alphanumeric indicia thereon and may have a display. Actuating the keys 46 in a predetermined sequence allows for actuation of the system 30. At the least, the devices 40, 42 and 44 are able to initiate opening and closing movements of the door coupled to the base operator 34. The base operator 34 monitors operation of the motor and various other connected elements. Indeed, the base operator 34 may even know the state, condition or position of the door 12, and the previous operational movement of the door 12. A power source is used to energize the components of the system 10 in a manner well known in the art.

The base operator 34 includes a controller 52, which incorporates the necessary software, hardware and memory storage devices for controlling the operation of the overall system and for implementing the various advantages of the present invention. It will be appreciated that the implementation of the present invention may be accomplished with a discrete processing device that communicates with an existing base operator. This would allow the inventive aspects to be retrofit to existing operator systems. In electrical communication with the controller 52 is a non-volatile memory storage device 54, such as a flash memory, for permanently storing information utilized by the controller 52 in conjunction with the operation of the base operator 34. The memory device 54 may maintain identification codes, state variables, count values, timers, door status and the like to enable operation of the mobile transmitter. Infrared and/or radio frequency signals generated by transmitters 40, 42, 44 and the mobile transmitter are received by a base receiver 56 which transfers the received information to a decoder contained within the controller 52. Those skilled in the art will appreciate that the base receiver 56 may be replaced with a transceiver, which would allow the controller 52 to facilitate learning of other devices, or to relay or generate command/status signals to other devices associated with the operator system 10. The controller 52 converts the received radio frequency signals or other types of wireless signals into a usable format. It will be appreciated that an appropriate antenna is utilized by the base receiver 56 for receiving the desired radio frequency or infrared signals from the various wireless transmitters 40,42,44. The controller 52 may comprise a Model MSP430F1232 supplied by Texas Instruments, however other equivalent receivers, transceivers and controllers could be utilized. Indeed, the controller for the hands-free operation may be different and separate than the controller for the motor control operation, or a single controller may be used for both operations.

The base receiver 56 is directly associated with the base operator 34, however the base receiver 56 could be a stand-alone device if desired. The base receiver 56 receives signals in a frequency range centered about 372 MHz generated by each of the transmitters 40,42,44. The base receiver 56 may also receive signals in a frequency range of 900 to 950 MHZ. And the receiver 56 may be adapted to receive both ranges of frequencies. Indeed, one frequency range may be designated for only receiving door move signals from a transmitter, while the other frequency range receives identification type signals used to determine position or travel direction of a mobile transmitter relative to the base receiver, and also door move signals. Of course, other frequency ranges compatible with the system 10 and approved for use by the appropriate government agency may be used.

The controller 52 is capable of directly receiving transmission type signals from a direct wire source as evidenced by the direct connection to the wall station 42. And the keyless device 44, which may also be wireless, is also connected to the controller 52. Any number of remote transmitters 40*a-x* can transmit a signal that is received by the base receiver 56 and further processed by the controller 52 as needed. Likewise, there can be any number of wall stations 42. If an input signal is received from the remote transmitter 40, the wall station control 42, or the keyless device 44 and found to be acceptable, the controller 52 generates the appropriate electrical input signals for energizing a motor 60, which in turn rotates the drive shaft 36 and opens and/or closes the access barrier 12. A learn button 59 may also be associated with the controller 52, wherein actuation of the learn button 59 allows the controller 52 to learn any of the different types of transmitters 40,42,44 used in the system 10 in a manner commonly known in the art.

A light 62 is connected to the controller 52 and may be programmed to turn on and off depending upon the conditions of the mobile transmitter and how it is associated with the controller 52. Likewise, an alarm system 64 may be activated and/or deactivated depending upon the position of a mobile transmitter 70 with respect to the base receiver 56.

A discrete add-on processing device is designated generally by the numeral 65 and is primarily shown in FIG. 2, although other components of the device are also shown in FIG. 1. The device 65 may be employed to modify already installed base operators 34 that control barrier movement, wherein the existing units may or may not have an existing receiver. In any event, the device 65 includes an open limit switch 66*a* and a close limit switch 66*b*, each of which detects when the access barrier or door 12 is in a corresponding position. This may be done in most any manner, and in this embodiment a magnet 67 is secured to a leading or trailing edge, or adjacent side surface of the door as shown in FIG. 1. In one embodiment, the magnet 67 is attached to a lower portion of the lowermost sectional door panel in a position proximal one of the tracks 26. At least a pair of magnetic sensors 68 are positioned in the track 26 proximal the magnet 67 so as to form the respective limit switches 66*a* and 66*b*. Accordingly, when the magnet 67 is proximal a sensor 68 located in the track, an appropriate signal is generated. The signals, when generated, indicate when the door 12 is in an open position or a closed position. Of course, other types of sensor arrangements, such as tilt switches, positional potentiometers and the like, could be used to indicate the positional or operational status of the door 12.

An add-on controller 69 is included in the device 65 and includes the necessary hardware, software and memory needed to implement this variation of the invention. The memory maintained by the controller 69 may include buffers for storing a number of received signals. If needed, the base receiver 56 may be incorporated into the device 65 and operate as described above, except that the signals received are sent to the add-on controller 69. The add-on controller 69 may provide a learn button 59*x* that allows transmitters to be associated therewith in a manner similar to that used by the controller 52.

The add-on controller 69 receives input signals from at least the limit switches 66. Additionally, the add-on controller 69 may receive input from the receiver 56 if an appropriate receiver is not already provided with the existing base operator 34. In any event, based upon input received, the add-on controller 69 generates signals received by the controller 52 to initiate opening and closing movements of the access barrier or door 12 in a manner that will be described below.

II. Mobile Transmitter

The mobile transmitter 70, which may also be referred to as a hands-free transmitter or a proximity device, is provided by the system 10, and effectively operates in much the same manner as the other wireless transmitters 40, 42, 44, except direct manual input from the user is not required, although manual input could be provided. As will be discussed in detail, the transmitter 70, serving as the actuation device, initiates the movement of the barrier 12, or a change in a state of the base operator 34. The change in state or initiation of movement depends upon a number of factors such as: proximity of the mobile transmitter to the base receiver 56 maintained by the base operator 34 or the device 65; the direction of travel of the mobile transmitter 70 with respect to the receiver 56; and/or the operational status of the various devices that may be carrying the mobile transmitter 70. The mobile transmitter 70 includes a processor 72 connected to a non-volatile memory 74. As will be discussed in further detail, the memory 74 may maintain system mobile state variables, count values, timer values, signal counts and the like which are utilized to enable operation of the overall system.

Further, the mobile transmitter 70 includes an emitter 76 that is capable of generating a mobile signal 78 on a periodic or a recognizable non-periodic basis. For example, the transmitter may output data for about one minute in the form of a 100 ms burst of data and a 900 ms pause (no data outputted), repeated 60 times. The data and/or format of the emitted mobile signal 78 may be changed depending upon a detected operational status of a carrying device 79, such as a vehicle for example, that is used to carry the mobile transmitter 70. Indeed, the mobile signal 78 may comprise multiple signals, each of which initiates different functions by the controller 52 or add-on controller 69. The processor 72 includes the necessary hardware, software and memory for generating signals to carry out the invention. The processor 72 and the memory 74 facilitate generation of the appropriate data to include in the mobile signal 78 inasmuch as one remote mobile transmitter 70 may be associated with multiple base operators 34 or devices 65 or in the event multiple remote mobile transmitters 70 are associated with a single base operator 34 or device 65. In other words, the base controller 52 or add-on controller 69 is able to distinguish the mobile signals 78 of different mobile transmitters 70 and act upon them accordingly. The system 10 will most likely be configured so that any door move commands generated by the mobile transmitter 70 can be overridden by any commands received from the portable transmitter 40, wall station transmitter 42, and keypad transmitter 44. It will be appreciated that most all transmitters disclosed herein can override hands-free operation.

A learn/door move button 82 and a sensitivity/cancel button 83, are also provided by the mobile transmitter 70, which allows for override commands and/or programming of the mobile transmitter 70 with respect to the controller 52 or add-on controller 69. Generally, the mobile transmitter 70 allows for "hands-free" operation of the access barrier 12. In other words, the mobile transmitter 70 may simply be placed in a glove compartment or console of an automobile or other carrying device 79, and communicate with the controller 52 or add-on controller 69 for the purpose of opening and closing the access barrier 12 depending upon the position of the mobile transmitter 70 with respect to the base receiver 56. As such, after the mobile transmitter 70 and the controller 52 or add-on controller 69 are learned to one another, the user is no longer required to press a door move button or otherwise locate the mobile or remote transmitter before having the garage door open and close as the carrying device approaches or leaves the garage. If needed, manual actuation of a button 82, after programming, may be used to override normal operation of the mobile transmitter 70 so as to allow for opening and closing of the access barrier 12 and also to perform other use and/or programming functions associated with the base operator 34. Actuation of the button 83, after programming, provides for temporary disablement of the hands-free features.

The mobile transmitter 70 may utilize an activity-type sensor 84, which detects the acceleration or movement of the carrying device 79, which will be discussed in more detail later. In the alternative, the mobile transmitter 70 may be connected directly to an engine sensor, such as an accessory switch, of the automobile. The engine sensor, as with the other activity-type sensors 84, determines the operational status of the carrying device 79, which causes the mobile transmitter 70 to generate mobile signals 78, which in turn, initiates barrier 12 movement.

Additional features that may be included with the mobile transmitter 70 are an audio source 94 and a light source 96. It is envisioned that the audio source 94 and/or the light source 96 may be employed to provide audible instructions/confirmation or light indications as to certain situations that need the immediate attention of the person utilizing the mobile transmitter 70. The audio and light sources 94 and 96 may also provide confirmation or rejection of the attempted programming steps to be discussed later. All of the components maintained by the mobile transmitter 70 may be powered by a battery used by the carrying device 79 or alternatively by a portable power source such as a battery 97 that is housed within the mobile transmitter 70. If desired, the battery 97 may be of a rechargeable type that is connectable to a power outlet provided by the carrying device 79.

During normal operation, the mobile transmitter 70 will be in an enabled condition. In the enabled condition, the transmitter 70 may be in either a sleep mode or an awake mode. In a sleep or low-power mode, the transmitter consumes a few uA (e.g. 3 uA) of current. And in an awake mode, the transmitter consumes tens of mA of current (e.g. 75 mA). However, the mobile transmitter 70 may be disabled by actuating both buttons for a predetermined period of time. In the alternative, a slide switch 99, which is ideally recessed in the transmitter housing of the mobile transmitter 70, can be used to quickly enable or disable the operation of the transmitter 70. The switch 99 is connected to the processor 72, and upon movement of the switch 99 to a disable position, a cancel command is automatically generated prior to powering down. This is done so that the base controller 52 will not assume that the power down is some other type of signal such as loss of a close signal.

Figure 3:
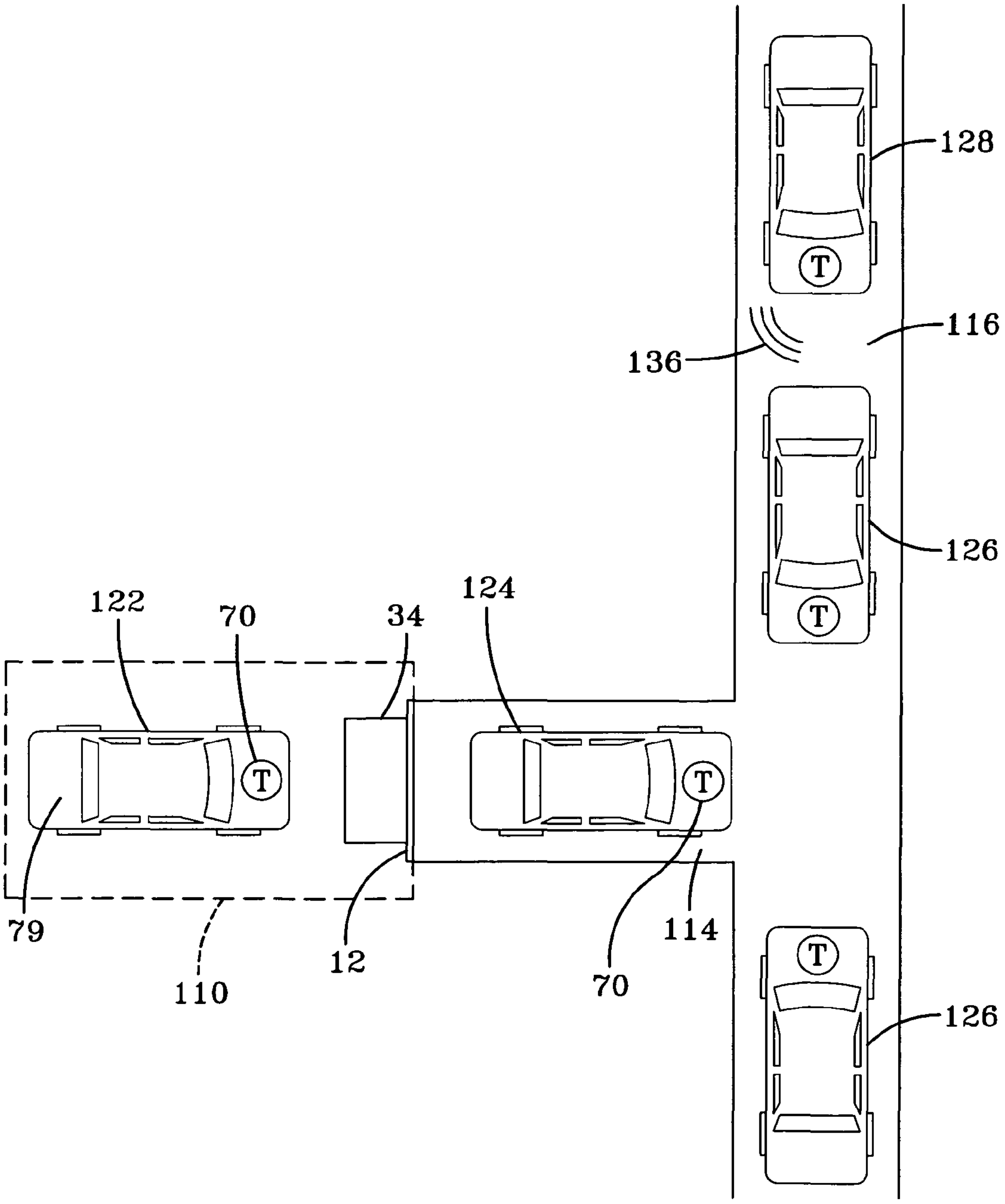
FIG. 3 is a schematic diagram of various positions of an exemplary carrying device with respect to an access barrier that utilizes the operator system according to the present invention.

Referring now to FIG. 3, shows the carrying device 79, which carries the mobile transmitter 70, in various positions with respect to the base operator system 34. Typically, the carrying device 79 is a vehicle maintained in a garage or other enclosure generally indicated by the numeral 110. The enclosure 110 is separated from its outer environs by the access barrier 12 which is controlled by the base operator 34 in the manner previously described. The enclosure 110 is accessible by a driveway 114 which is contiguous with a street 116 or other access-type road.

The carrying device 79 is positionable in the enclosure 110 or anywhere along the length of the driveway 114 and the street 116. The carrying device 79 may be in either a "docked" state inside the enclosure 110 or in an "away" state anywhere outside the enclosure 110. In some instances, the "away" state may further be defined as a condition when the signals generated by the mobile transmitter 70 are no longer receivable by the receiver 56. As the description proceeds, other operational or transitional states of the mobile transmitter 70 will be discussed. As will become apparent, the mobile transmitter 70 initiates one-way communications with the controller 52 provided by the base operator 34. Although in certain embodiments, two-way communications between the base operator and the mobile transmitter may be employed.

The mobile transmitter 70 may generate signals at different power levels, which are detected by the controller 52, or the mobile transmitter 70 may generate a single power level signal and the controller 52 determines and compares signal strength values for successive mobile signals 78. In any event, to assist in understanding the states and the power thresholds, specific reference to positions of the carrying device 79 with respect to the enclosure 110 are provided. In particular, it is envisioned that a docked state 122 is for when the automobile or other carrying device 79 is positioned within, or in some instances just outside, the enclosure 110. An action position 124 designates when the carrying device 79 is immediately adjacent the barrier 12, but outside the enclosure 110 and wherein action or movement of the barrier 12 is likely desired. An energization position 126, which is somewhat removed from the action position 124, designates when an early communication link between the transponder 76 and the receiver 56 needs to be established in preparation for moving the barrier 12 from an open to a closed position or from a closed position to an open position. Further from the energization position(s) 126 is an away position 128 for those positions where energization or any type of activation signal generated by the emitter 76 and received by the operator system is not recognized until the energization position(s) 126 is obtained. Indeed, entry into the away position 128 may be recognized by the base controller 52 and result in initiation of barrier 12 movement.

A. Activity Sensors

As will be discussed, the mobile transmitter 70 utilizes an activity sensor 84 to determine when the carrying device 79 is active or otherwise moving. The sensor 84 ideally will be sensitive enough to detect a user entering the vehicle or carrying device. In particular, various sensors may be used to detect the movement of the carrying device 79, so as to indicate that it is in an operative condition.

Figure 4:
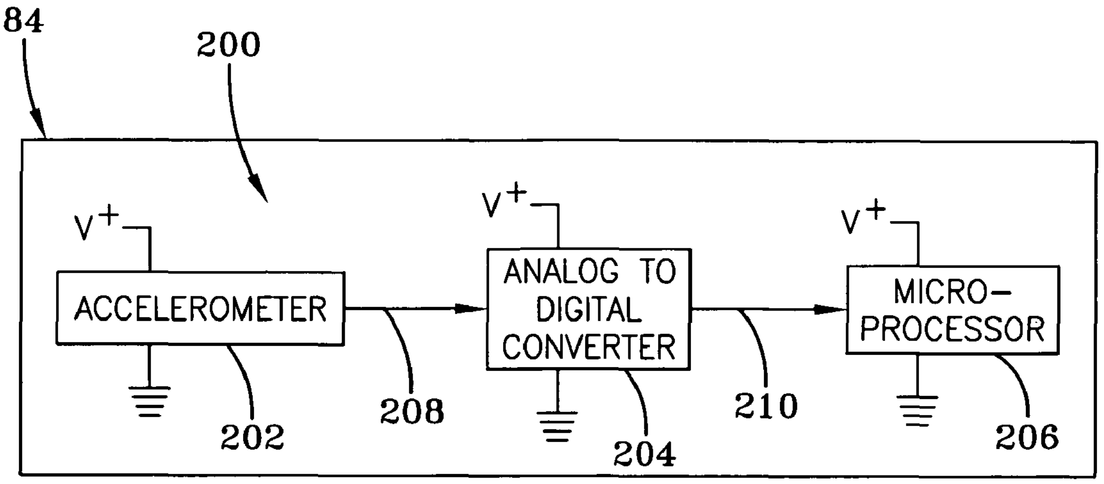
FIG. 4 is a block diagram of an activity sensor in the form of an accelerometer incorporated into the mobile remote transmitter utilized with the operator system according to the prevent invention.

Referring now to FIG. 4, an exemplary detection circuit incorporated into the activity sensor 84 is designated generally by the numeral 200. Generally, after determining whether the carrying device 79 is active, as evidenced by movement of the carrying device 79 in FIG. 5, the detection circuit 200 notifies the processor 72 of the mobile transmitter 70 whether to "Wake Up" or "Go to Sleep." Thus, the circuit 200 allows a user to go a longer time without changing or re-charging the batteries 97 of the mobile transmitter 70. Alternatively, this circuit 200 may allow manufacturers to place smaller batteries in the mobile transmitter 70 while still offering users an equivalent battery life.

Specifically, the detection circuit 200 may comprise a motion detector such as an accelerometer 202, an analog-to-digital (A/D) converter 204, and a microprocessor 206. The accelerometer 202 is configured to detect acceleration along a single axis (e.g x-axis) or along multiple axes (e.g. x-axis, y-axis and z-axis). An exemplary accelerometer is ADXL 323 manufactured by Analog Devices of Norwood, Mass. Thus, as the mobile transmitter 70 is accelerated due to the movement of the carrying device 79, the accelerometer 202 detects such acceleration or motion and outputs an analog detection signal 208 to the A/D converter 204. The A/D converter 204 digitizes the analog detection signal into a digital signal 210 so that it can be processed by the microprocessor 206 to determine whether the carrying device 79 has moved or not. It is contemplated that the accelerometer may output a digital signal directly, thus obviating the need for the A/D converter 204 previously discussed. Furthermore, the microprocessor 206, which is in communication with the controller 52 via the signals 78, comprises the necessary hardware and software needed to interpret the detection signals output from the accelerometer 202. Additionally, the functions provided by the microprocessor 206 may be carried out by the processor 72 maintained by the mobile transmitter 70.

Figure 5:
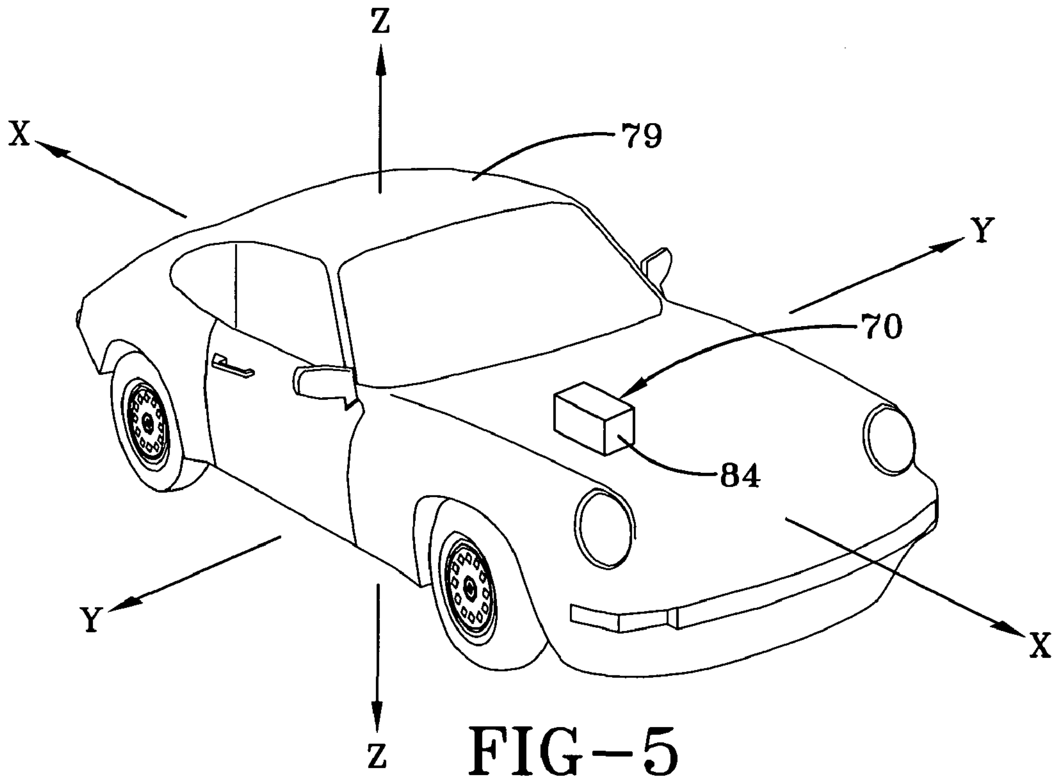
FIG. 5 is an elevational view showing the x, y and z axes that the accelerometer is monitoring.
Figure 6:
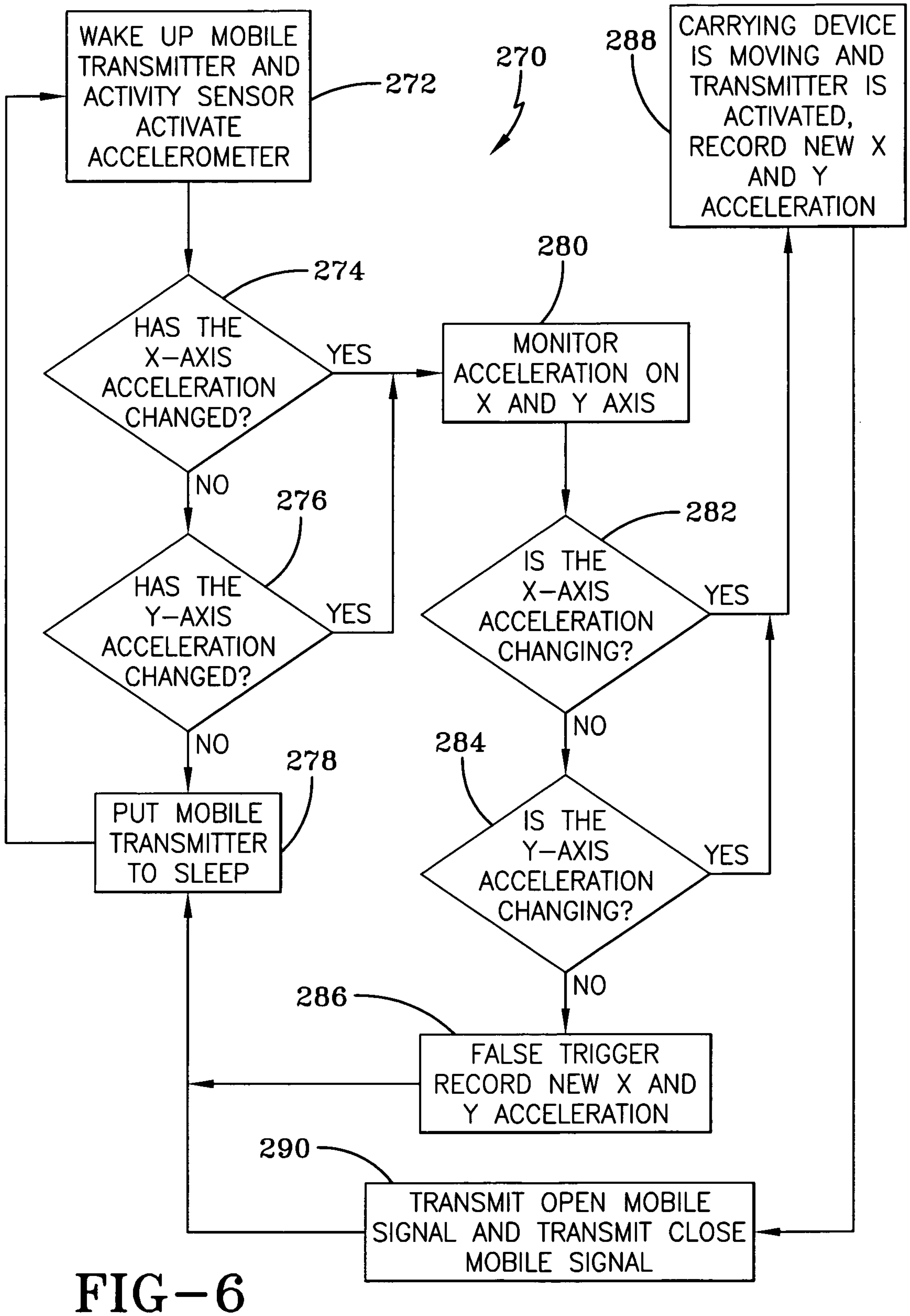
FIG. 6 is an operational flow chart showing the operational steps taken by the mobile transmitter employing the accelerometer shown in FIG. 4 to minimize power usage thereof.

Referring now to FIG. 6, the operational steps taken by the activity sensor 84 comprising the detection circuit 200 are illustrated in the flow chart designated generally by the numeral 270. Initially, at step 272, the mobile transmitter 70 is made active so that the accelerometer 202 is enabled, or otherwise activated so that it is able to detect acceleration changes of the carrying device 79 made in the x and y direction, or in combinations thereof, as shown in FIG. 5. The accelerometer is awakened periodically about once every one to two seconds, although any "wake up" time period could be used. It will also be appreciated that this waking of the accelerometer consumes very little power and is not a significant drain on the battery used to power the activity sensor. Once the accelerometer 202 is enabled, the process 270 proceeds to step 274 to determine whether the acceleration of the carrying device 79 has changed along the x-axis of the accelerometer 202. If the acceleration of the carrying device 79 has not changed in the x-axis direction, then the process 270 continues to step 276. At step 276, the process 270 determines whether the acceleration of the carrying device 79 has changed in the y-axis direction. If the acceleration of the carrying device 79 has not changed in the y-axis direction, then the process 270 continues to step 278, where the mobile transmitter 70 is put to "sleep" for a period of time until it is "awakened." Once the mobile transmitter 70 is awakened, the process 270 returns to step 272. If at respective steps 274 or 276, a change of acceleration is detected in either the x-axis or the y-axis direction of the accelerometer 202, the process 270 continues to step 280. At step 280 the acceleration of the carrying device 79 along both the x and y axes of the accelerometer 202 is monitored. Somewhat simultaneously with step 280, step 282 determines whether the magnitude of the acceleration of the direction of the x-axis is changing. If the acceleration of the carrying device 79 is not changing in the x-axis direction, then the process 270 continues to step 284, where the magnitude of the acceleration in the y-axis direction is ascertained. If the acceleration of the carrying device 79 is not changing in the x or y direction, then the process 270 continues to step 286. At step 286 the process 270 recognizes that the mobile transmitter 70 has been subjected to a false trigger, records new x and y values, and returns to step 278 where the activity monitor 84 is returned to a sleep mode. However, if the acceleration of the carrying device 79 has changed in the x-axis or y-axis direction at steps 282 or 284 respectively, then the carrying device 79 has moved, as indicated at step 288. In addition, at step 288, the mobile transmitter 70 records this new x and/or y axis acceleration value in its memory 74, and somewhat simultaneously the mobile transmitter 70 is activated so as to enable the transmission of an open mobile signal 78 and a close mobile signal 78 as indicated at step 290. The stored acceleration values may be used for later comparison in subsequent steps 274, 276, 282 and 284. After the open signal and the close signal are transmitted at step 290, the process 270 returns to step 278 where the mobile transmitter 70 is put to sleep. Although checking for a second axis of motion is used to confirm motion of the transmitter/carrying device, it will be appreciated that the checking for a third axis of motion could be used to further confirm movement. Handling of the open signal and close signal is discussed later.

Thus, when the carrying device 79 that contains the mobile transmitter 70 is not moving, the mobile transmitter 70 does not transmit any open or close signals. As such, the mobile transmitter 70 is able to better conserve power stored in its portable power source 97.

Use of the mobile transmitter 70 with the activity sensor 84 enables features such as an auto-open and auto-close functionality for the base operator 34. For example, for the auto-open feature, the user enters their car causing the accelerometer 202—provided the sensitivity of the accelerometer is appropriately set—of the activity sensor 84 to detect movement of the vehicle The mobile transmitter 70 then transmits signals to the base receiver relaying the information that the vehicle or carrying device is now active. Accordingly, the controller 52 associated with the base receiver 56 would receive this information and the operator 34 would initiate opening of the access barrier 12. At any time after activating the access barrier 12, the user can move the vehicle 79 and leave the enclosed area. And the hands-free functions of the mobile transmitter 70 will close the access barrier 12 at an appropriate time.

The auto-close feature would work in the following sequence. The user would park the vehicle 79 in the garage and turn the vehicle off. The accelerometer 202 would detect the non-movement of the vehicle 79 and stop sending the mobile signal 78. As such, the base receiver 56 and controller 52, not detecting the presence of the mobile signals, would then generate a "door close" command causing the base operator 34 to close the door 12.

B. Sensitivity Settings/Mobile Manual Input

Generally, the mobile transmitter 70 determines whether the carrying device 79 is active and initiates communications with the base controller 52 via the base receiver 56. The mobile transmitter 70 is capable of generating various mobile signals 78 with different transmit power levels and, if needed, with different identification codes to the base controller 52 at an appropriate time. In response to the mobile signals 78 generated by the mobile transmitter 70, the base controller 52 executes the appropriate door move or status change commands. It will be appreciated that FIG. 7 sets forth the operations of the mobile transmitter 70 as it relates to button commands for programming or setting the desired sensitivity. The sensitivity level sets power levels to an approximate wireless signal range as to when the door 12 is to be opened or closed. And the sensitivity level may dictate values for variable counters used for system sensitivity. For example, sensitivity settings may be very different for opening a garage door or access barrier 12 that is associated with a short driveway as opposed to one that has a very long driveway. Sensitivity settings may also be adjusted according to whether the garage door is located in an electrically noisy environment. A discussion is also provided as to how manual door move or cancellation commands are processed.

Figure 7A:
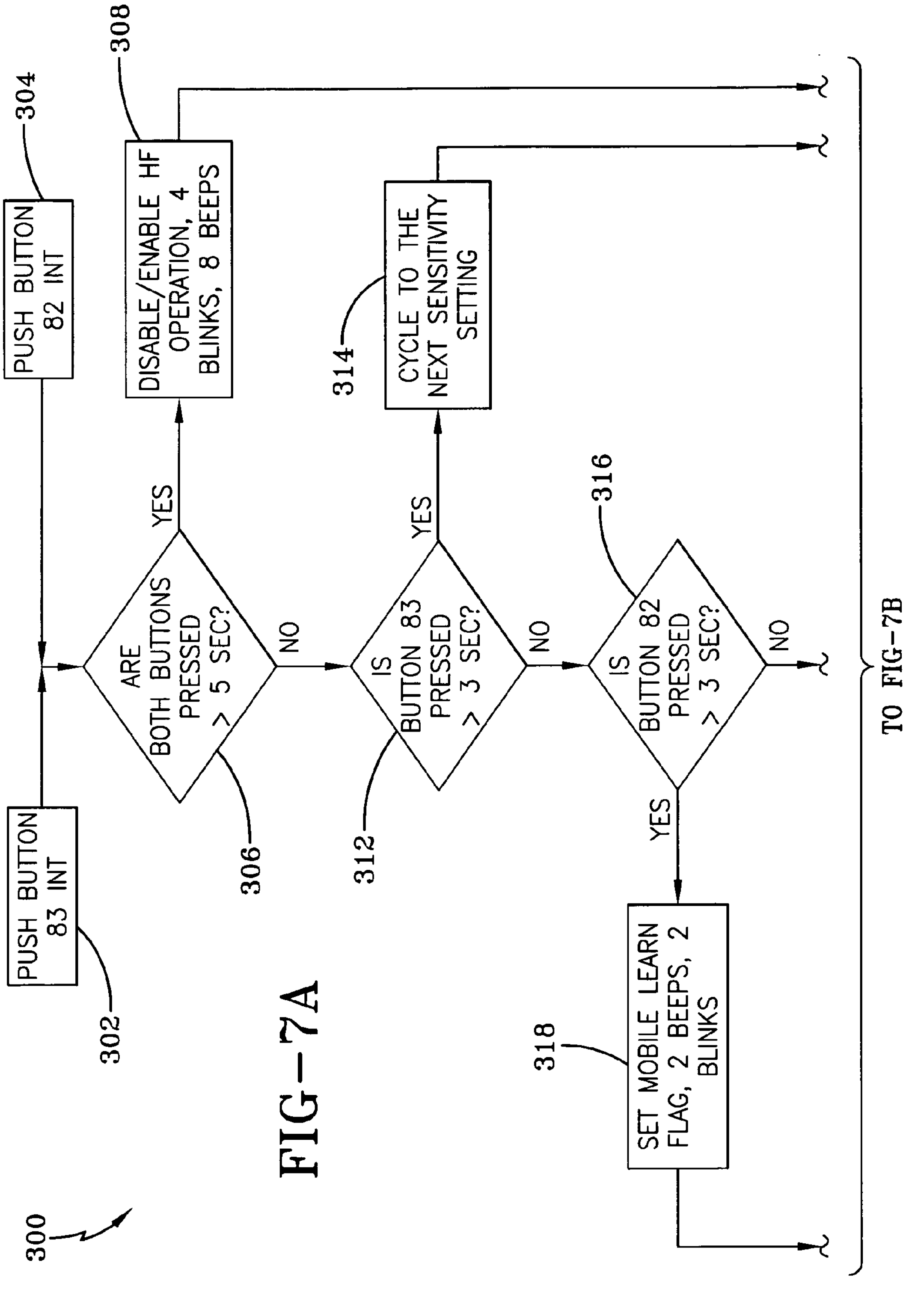
FIGS. 7A and 7B are an operational flowchart illustrating the initial programming and use of the mobile remote transmitter utilized in the operator system.
Figure 7B:
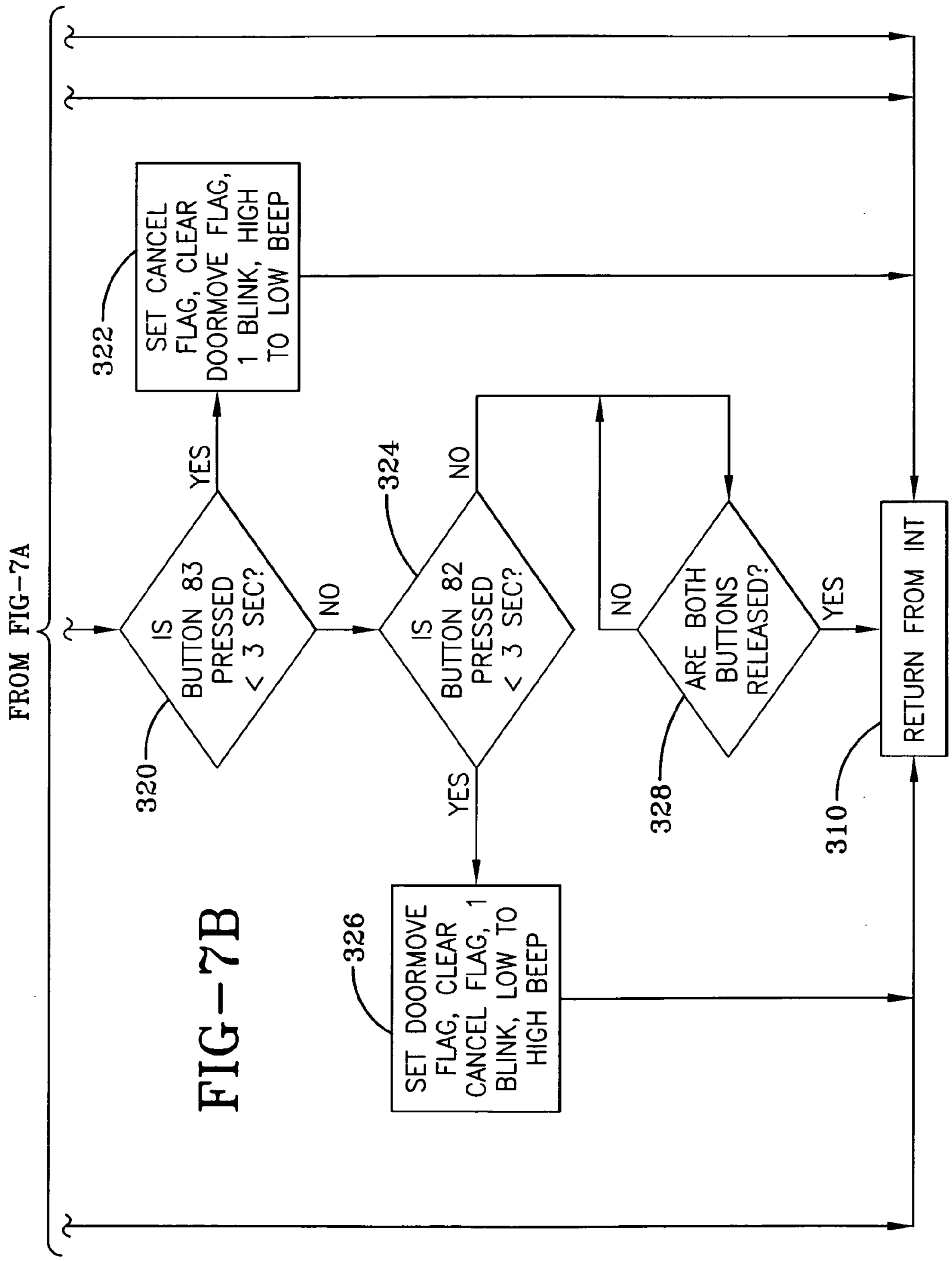

Referring specifically now to FIGS. 7A and 7B, it can be seen that a methodology for actuation of the buttons provided by the mobile transmitter 70 is designated generally by the numeral 300. As discussed previously, the mobile transmitter 70 includes a learn/door move button 82 and a sensitivity/cancel button 83. Accordingly, if the sensitivity/cancel button 83 is actuated at step 302, or if the learn/door move button 82 is actuated at step 304, then the processor 72 makes an inquiry as to whether both buttons 82/83 have been pressed simultaneously for greater than five seconds or some other predetermined period of time. If so, the operation of the mobile transmitter 70 is disabled or enabled, and this is confirmed by the four blinkings and eight beeps generated by the audio and light sources 94 and 96 respectively. It will be appreciated that other confirmation signals or sequence of beeps and blinkings could be used. In any event, upon completion of step 308 the process returns to step 310 and the remote mobile transmitter 70 awaits a next button actuation.

If at step 306 the buttons 82 and 83 are not pressed simultaneously for the predetermined period of time then the processor 72 inquires at step 312 as to whether the sensitivity/cancel button 83 has been pressed for a predetermined period of time such as three seconds. If the button 83 is held for more than three seconds, then at step 314 the processor 72 allows for cycling to a desired sensitivity setting. It will be appreciated that the mobile transmitter 70 may be provided with one or more transmit power levels. In this embodiment, there are four power levels available, and a different setting can be used for an open door command and a door close command, such that a total of sixteen different sensitivity settings could be established. For example, the four power levels may be designated, from lowest to highest, as P0, P1, P2 and P3. Accordingly, one sensitivity setting could be OPEN=P0, CLOSE=P3; another as OPEN=P1, CLOSE=P3 and so on for a total of sixteen available settings. If at step 312 it is determined that button 83 has not been pressed for more than three seconds, the process continues to step 316 to determine whether the learn/doormove button 82 has been pressed for a predetermined period of time, such as three seconds, or not. If the learn/doormove button 82 has been pressed for more than three seconds, then at step 318 the mobile learn flag is set and this is confirmed by the beeping of the audio source 94 twice and the blinking of the light source 96 twice. Upon completion of the confirmation, the process proceeds to step 310 and normal operation continues. If, however, at step 316 it is determined that the learn/doormove button 82 has not been pressed for three seconds, then the process continues to step 320 where the processor 72 determines whether the sensitivity/cancel button 83 has been momentarily pressed or not. If the learn/door move button 82 has been pressed momentarily (less than 3 sec), then at step 322 a cancel flag is set, a doormove flag is cleared, and a confirmation signal in the form of one blink by the light source 96 and a high to low beep generated by the audio source 94. And then the process is completed at step 310.

If at step 320 the sensitivity/cancel button 83 is not pressed momentarily, then the process inquires as to whether the learn/door move button 82 has been momentarily pressed (<3 s) or not at step 324. If the button 82 has been momentarily pressed (<3 s), then at step 326 the doormove flag is set, the cancel flag is cleared and a confirmation is provided in the form of one blink and a low to high beep or audio tone. This step allows for execution of a manual doormove command if desired. If button 82 is not momentarily pressed at step 324, then the processor, at step 328, awaits for both buttons to be released. Once this occurs then the process is completed at step 310.

III. Mobile/Operator Operation

Figure 8:
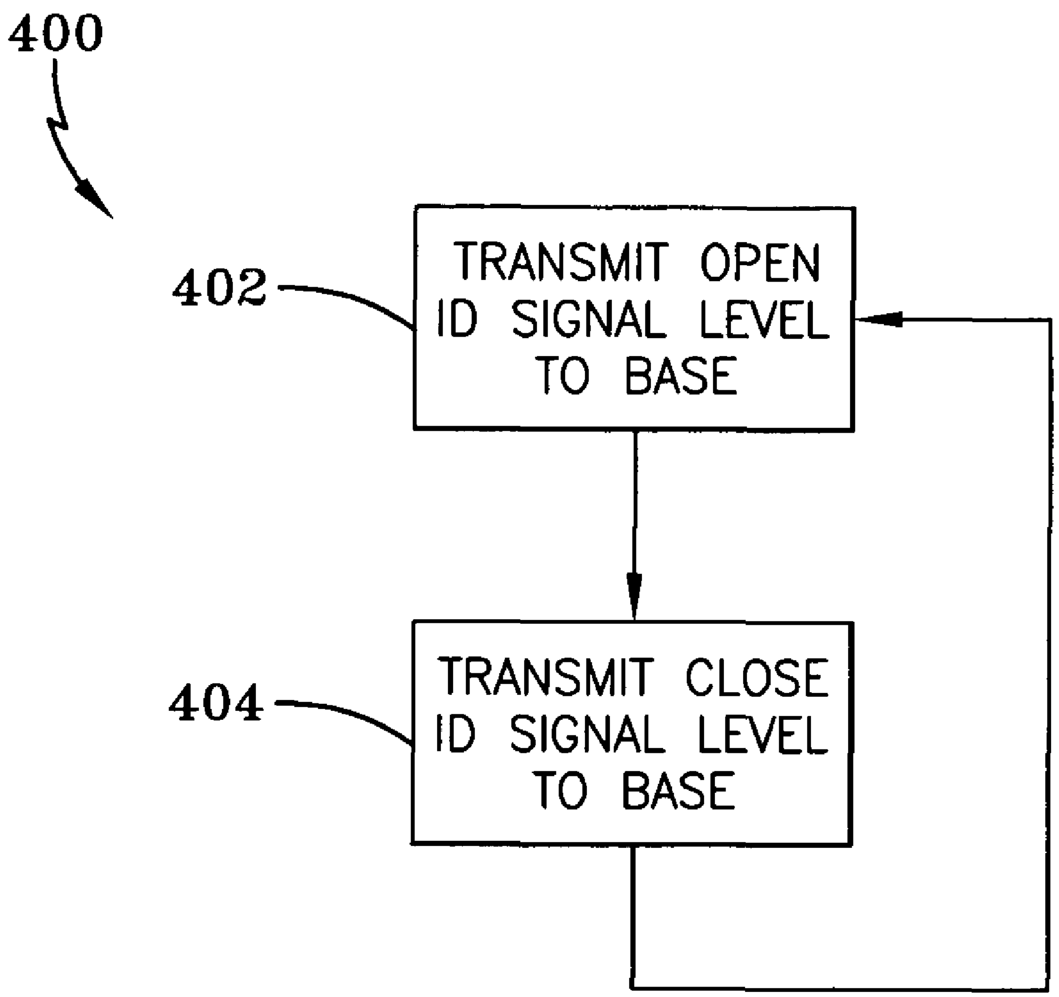
FIG. 8 is an operational flowchart illustrating the operation of the mobile transmitter utilized in the operator system.

FIGS. 8-10 are directed to a first embodiment wherein the mobile transmitter 70 somewhat periodically generates an open identification signal and then a close identification signal, and wherein both are received by a controller 52 provided by the base operator 34 for the automatic opening and closing of the access barrier 12.

Figure 11:
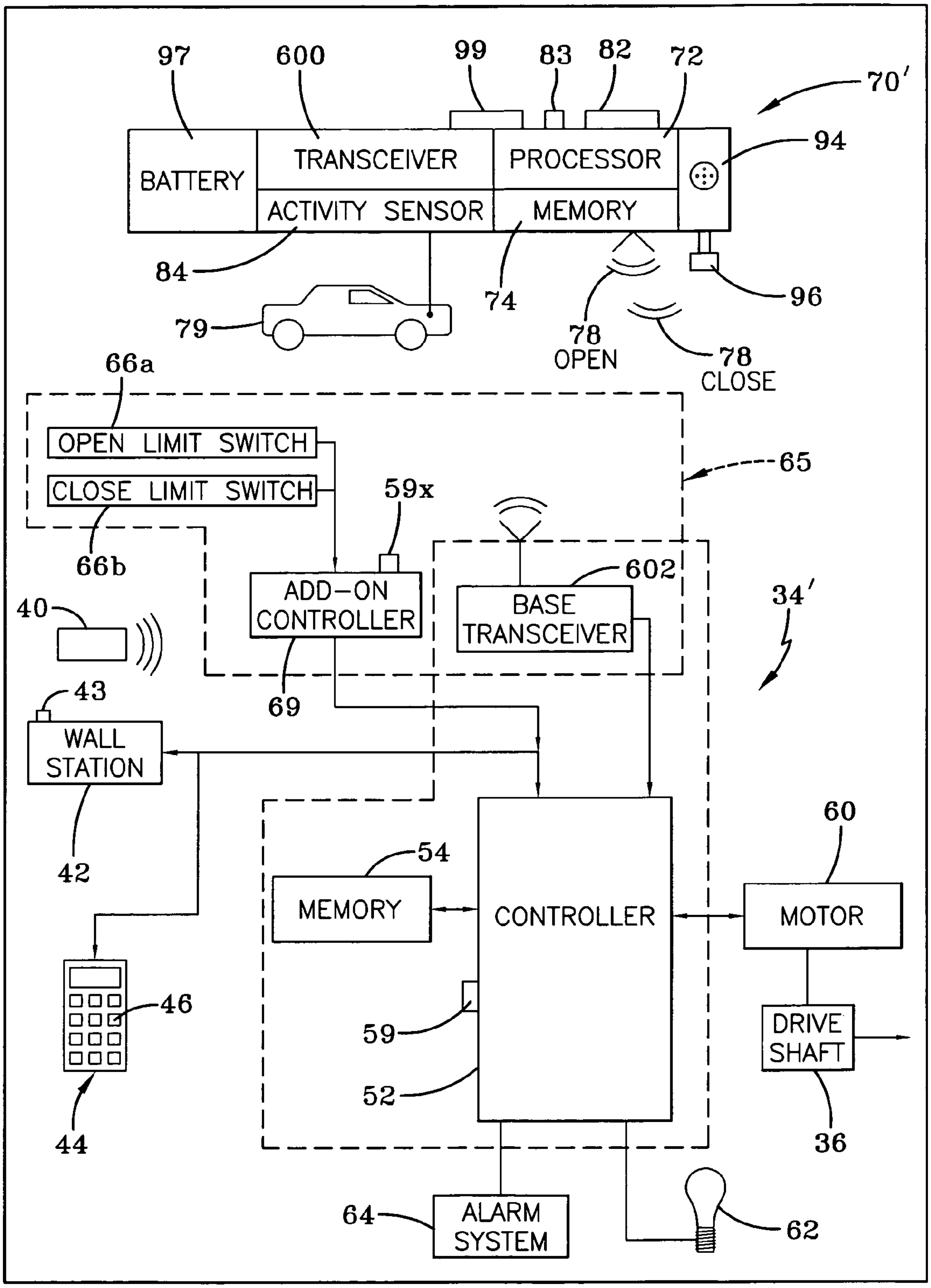
FIG. 11 is a block diagram of another embodiment of a hands-free mobile remote transmitter which includes a transceiver to facilitate learning of the transmitter to a base operator.
Figure 12:
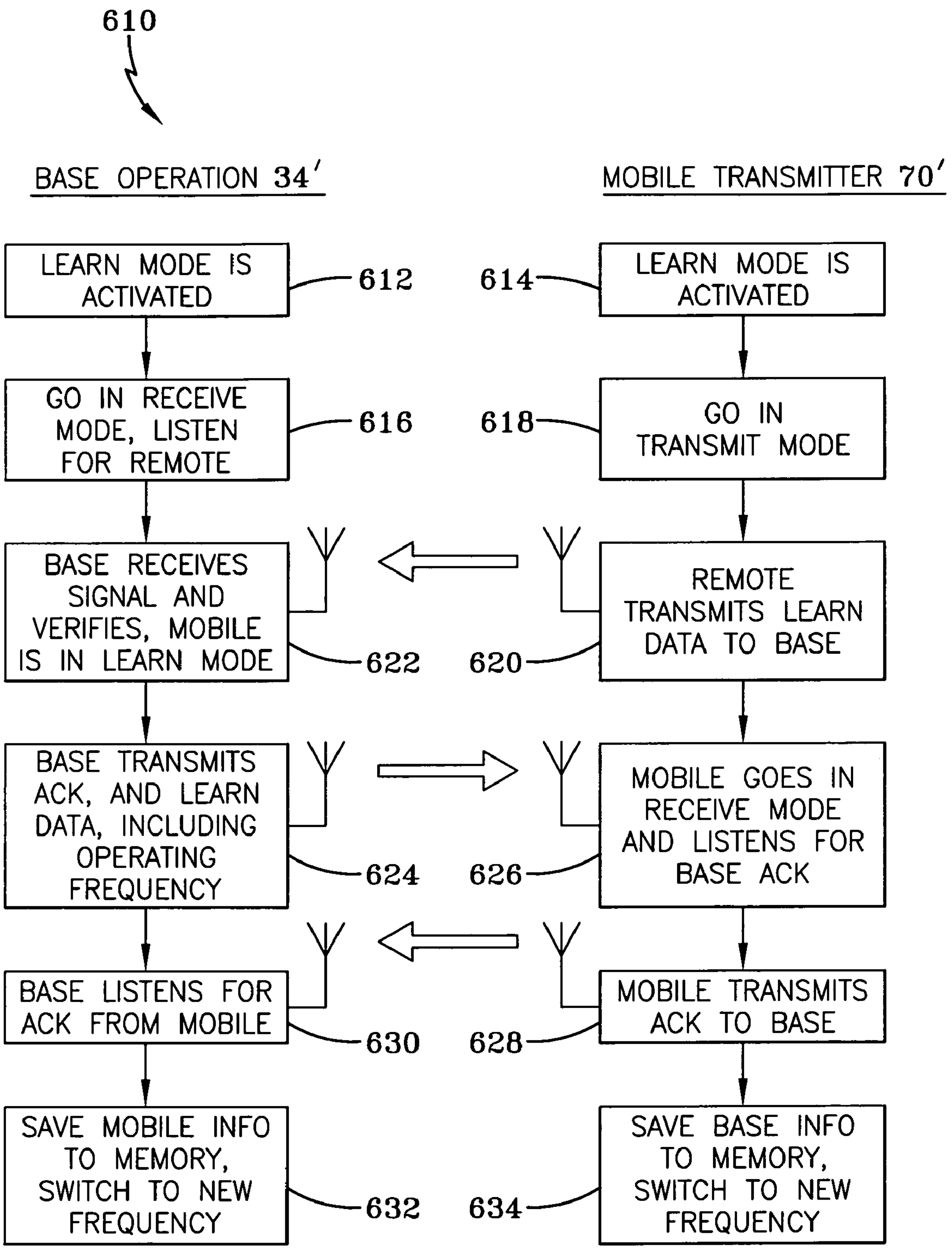
FIG. 12 is an operational flowchart illustrating the operational steps of the embodiment shown in FIG. 11 that are taken to learn the mobile transmitter to the base operator.

FIGS. 11 and 12 are directed to another embodiment of the mobile transmitter 70 that utilizes a transceiver to facilitate the process of learning the mobile transmitter to the controller 52 provided by the base operator 34.

A. Dual Transmitter Signals

Referring now to FIG. 8, it can be seen that a methodology for operation of the mobile transmitter 70 is designated generally by the numeral 400. Ideally, the mobile transmitter 70 is powered by the self-contained power source 97, such as a battery, that may or may not be re-chargeable. Accordingly, when the accelerometer 202 detects movement of the carrying device 79, as previously discussed, the mobile transmitter 70 transmits various mobile identification signals 78, such as the mobile open and close identification signal also referred to by the numeral 78. At step 402, the emitter 76 generates the mobile open identification signal 78 that is receivable by the base receiver 56. Subsequently, at step 404, the emitter 76 generates a mobile close identification signal 78 that is also receivable by the base receiver 56. Upon completion of step 404 the process returns to step 402 after an appropriate delay. It will be appreciated that the time period between steps 402 and 404 may randomly change so as to avoid radio frequency interference with other remote transmitters. As previously discussed, the mobile open identification signal 78 and the mobile close identification signal 78 may be transmitted at equal or different power levels, but in either case the base receiver 56 is able to distinguish between the two. The setting of the power levels, as discussed in relation to FIG. 8, facilitates operation of the system 10. Initially, the mobile identification signals 78 are established at the manufacturing facility, but the amplitude of the signals 78 are adjustable by the consumer or installer. In addition to the mobile open and close identification signals 78 it will be appreciated that the mobile transmitter 70 can also send a "command" signal when activated manually. In any event, each identification signal can have a different signal strength (amplitude) wherein the present embodiment allows for four signal strengths for each identification signal. Of course, any number of different signal strengths could be used. The amplitude settings can be programmed by the consumer or the installer with a program button responding to audible or visual signals provided by the respective sources on the transmitter. It is believed that the consumer or installer will set the individual signal strengths differently so that the arriving identification signal (i.e. the signal used to open the barrier) will have a higher strength signal than the departing identification signal (i.e. the signal used to close the barrier). Accordingly, the arriving identification signal causes the controller 52 to generate a "command" to open the door 12 sooner, and lack of detection of the lowest strength identification signal causes the controller 52 to generate a "command" to close the door sooner. However, based upon the customer's needs, both identification signals could be the same strength. As will be discussed, it is possible that hands-free control of an actuation system, such as a garage door, could be accomplished with a single identification signal. In the alternative, if the mobile transmitter's operation is controlled by the activity sensor 84, then the steps 402 and 404 are only implemented when the carrying device 79 is on. When the carrying device 79 is off, the open and close identification signals are not generated, but a manual button push would generate the corresponding command signal.

Figure 9A:
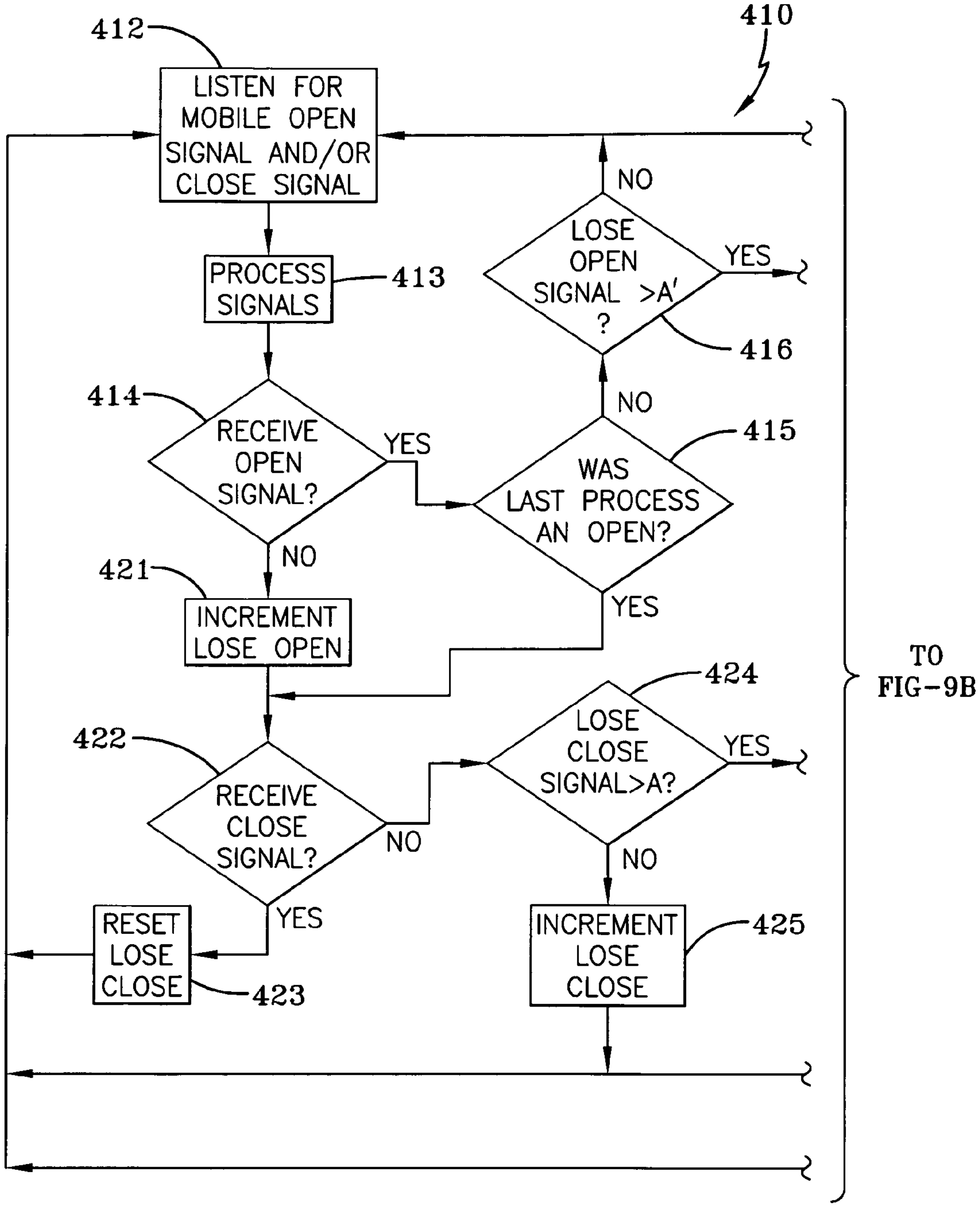
FIGS. 9A and 9B are an operational flowchart illustrating the operation of a base controller and the mobile transmitter.
Figure 9B:
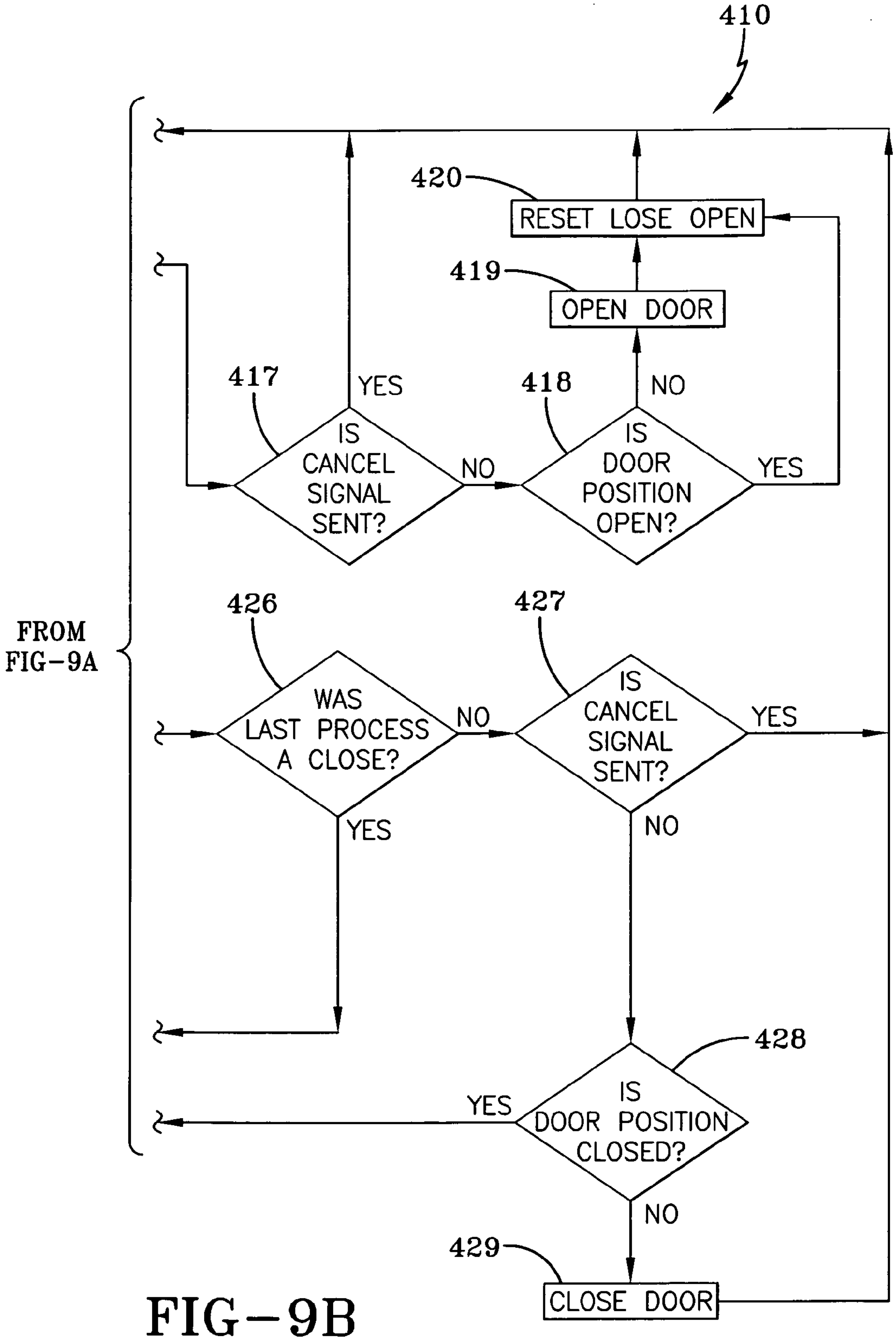

Referring now to FIGS. 9A and 9B, a basic methodology for operation of the base controller 52 is designated generally by the numeral 410. Initially, it will be appreciated that the mobile transmitter 70 is learned to the controller 52 provided by the base operator 34 in a conventional fashion by actuation of learn button 59 on the controller 52 and actuation of one of the buttons 82/83 on the transmitter 70. Of course, other learning methods could be used. In this basic methodology, the base controller 52 maintains a variable identified as "last process," which is initially set equal to "open" wherein this variable may be changed to "close" when appropriate. Other variables may be maintained to supplement and enhance operation of the system. For example, "lose open" (A') and "lose close" (A) variable counts are maintained to ensure that the mobile transmitter 70 is in fact out of range of the base operator 34 before any specific action is taken.

The controller 52 monitors frequencies detected by the base receiver 56, and in particular listens for an mobile open signal 78 and/or a close signal 78 generated by the mobile transmitter 70 at step 412. Next, at step 413 the methodology begins processing of the signals. At step 414 the base controller 52 determines whether an open signal 78 has been received or not. If an open signal 78 has been received, then the controller 52 investigates the "last process" variable at step 415 to determine whether the last course of action was an "open" door move or a "close" door move. If the last process variable was not "open," then at step 416, the controller 52 queries as to whether a process variable "lose open" is greater than A'. This query is made to ensure that an inappropriate action is not taken until the mobile transmitter 70 is in fact away or out of range of the base controller 52. If the lose open variable is not greater than A', then the process returns to step 412. However, if the lose open variable is greater than A', the controller 52 queries as to whether a cancel signal has been sent by the mobile transmitter 70 or not at step 417. If a cancel signal has been sent, then the process returns to step 412 and any door move command that would otherwise be generated by the controller 52 is not sent. If a cancel signal has not been received at step 417, then at step 418 the controller 52 determines whether the door position is open or not. As noted previously, the controller 52 is able to detect door position by use of mechanisms associated with the door movement apparatus. In any event, if the door position is open, the process continues to step 420 and the variable lose open is reset and then the process returns to step 412. However, if the door position is not open, as determined at step 418, then at step 419 the controller 52 executes an open door command, and the variable last process is set equal to open. And at step 420, the variable lose open is reset to a value, typically zero. Upon completion of step 420, the process returns to step 412.

Returning to step 414, if an open signal is not received, then at step 421 the lose open variable is incremented and the process continues at step 422. Or if at step 415 the last process variable is designated as open, then the process continues on to step 422 where the controller 52 determines whether a close signal 78 has been received or not. If a close signal has been received, then a "lose close" variable is reset and set equal to zero at step 423 and the process returns to step 412. However, if at step 422 a close signal 78 has not been received, then the process, at step 424, queries as to whether the lose close variable value is greater than a designated variable value A. If the answer to this query is no, then at step 425 the lose close variable is incremented by one and the process returns to step 412. The lose close variable is used so that a specific number of consecutive close signals 78 must be lost or not received before an actual close door move command is generated. Accordingly, if the lose close signal is greater than variable A at step 424, the controller 52 queries as to whether the variable last process was a close at step 426. If so, then the process returns to step 412. As will be appreciated, this procedural step prevents the controller 52 from closing/opening the door or barrier 12 multiple times when the mobile transmitter 70 is in a transitional position.

If at step 426 the last process variable is not equal to close, then at step 427 the process inquires as to whether a cancel signal has been received or not. If a cancel signal has been received, then the process returns to step 412. If a cancel signal has not been received, then at step 428 the controller 52 inquires as to whether the door position is closed or not. If the door position is closed, then the process returns to step 412. However, if the door position is not closed, then at step 429 the base controller 52 generates a door close command and the door is closed and the variable last process is set equal to close, whereupon the process returns to step 412.

As can be seen from the methodology 410, a simple use of an open signal 78 and a close signal 78 automatically generated by an active mobile transmitter 70 enables the hands-free operation so as to open and close the access barrier 12 depending upon the position of the mobile transmitter 70, and whether the position of the access barrier or door 12 is determined to be open or closed. The disclosed methodology is simple to implement and has been found to be effective in operation for most all residential conditions. It will be appreciated that the methodology shown in FIGS. 9A and 9B and described above is adaptable for use with a single identification signal. In such an embodiment, the steps 414 and 422 would be replaced with a single query as to whether a signal from the mobile transmitter 70 has been received or not. If a signal is received, the process would reset the lose close variable (step 423) and continue to step 415, where a YES response will direct the process to step 424. If a signal is not received, then the process will go directly to step 424. Step 425 would also increment the lose open variable (step 421).

Figure 10A:
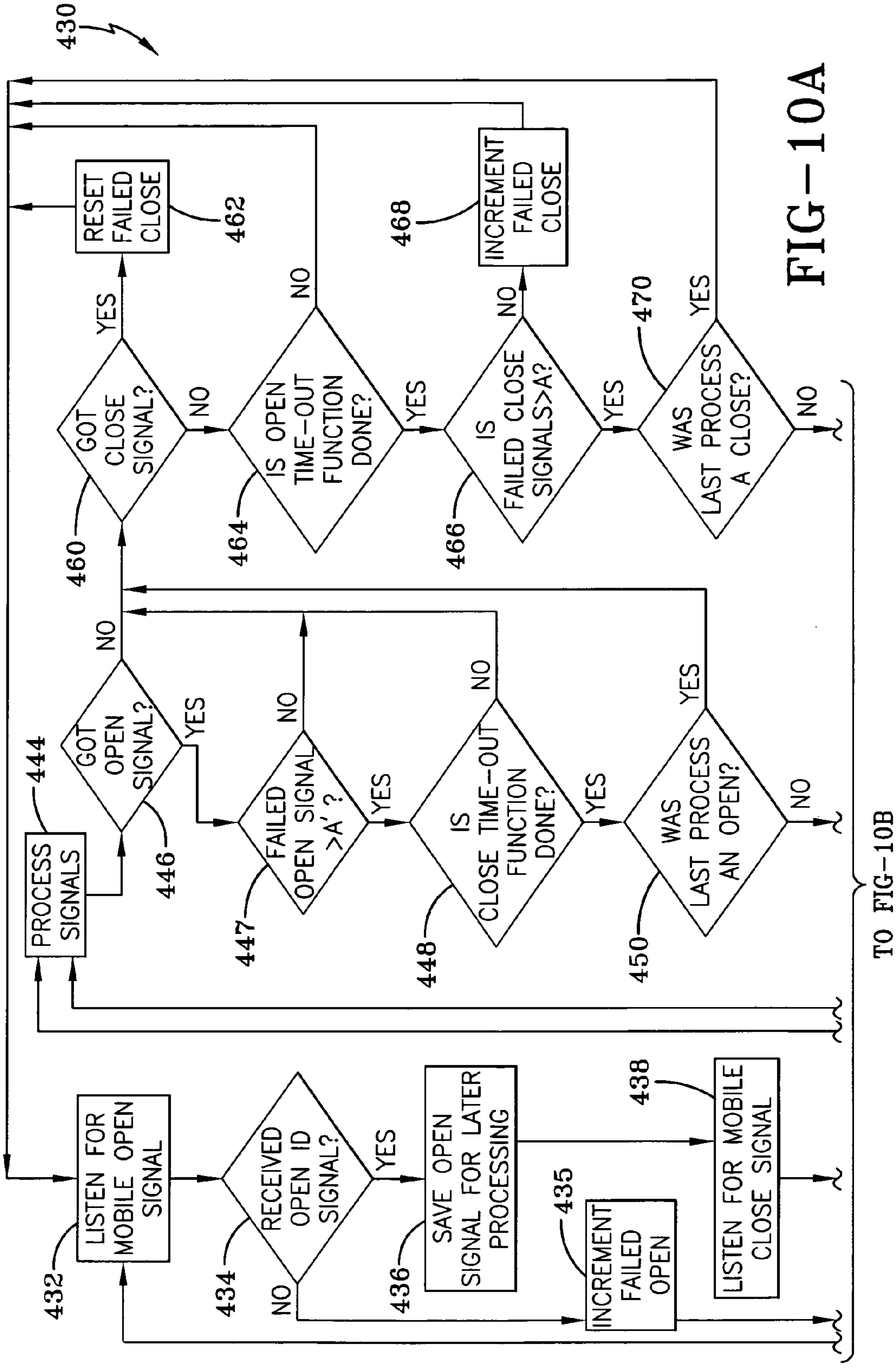
FIGS. 10A and 10B are a more detailed operational flowchart illustrating the operation of the base operator and the mobile transmitter.
Figure 10B:
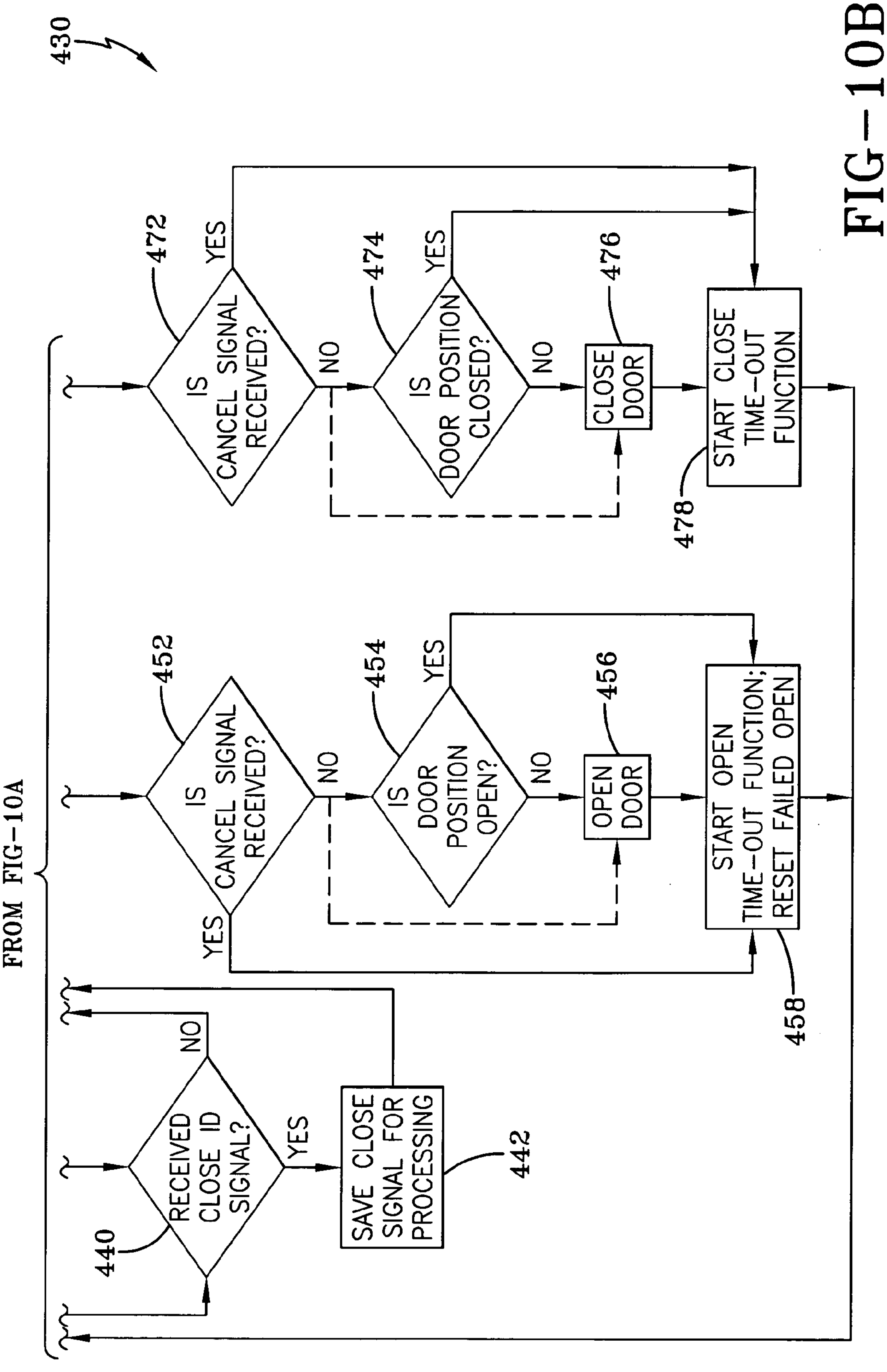

Referring now to FIGS. 10A and 10B, a more detailed methodology for operation of the base controller 52 is designated generally by the numeral 430. As with the basic operation, the remote mobile transmitter 70 may be learned to the controller 52 in a conventional fashion by actuation of a learn button 59 on the controller 52 and actuation of one of the buttons 82/83 on the transmitter 70. And in the detailed version, the base controller 52 utilizes information as to whether the door or access barrier 12 is in an open or closed condition, and whether the last course of action was an open or close movement. Other variables may be maintained to supplement and enhance operation of the system 10. Additionally, at least one door move time-out function and ideally two time-out functions are used so as to allow for ignoring of the mobile signals 78 during an appropriate period following a door move. As used herein, the time-out function may be implemented with a timer maintained by the controller 52 having a specific time value, or the time-out function may be associated with an expected number of mobile signals 78 to be received, wherein the frequency of the generated mobile signals is known by the controller 52 and a count associated therewith. In other words, after a door move operation, although mobile signals 78 continue to be received by the base controller 52, the time-out function prohibits mobile signals from being acted upon until completion thereof.

As a first step 432, the controller 52 listens for the mobile open identification signal 78. Next at step 434, the controller 52 monitors for receipt of the mobile open identification signal 78. If an open identification signal is not received, then at step 435 a variable failed open is incremented by one and the process continues to step 440. However, if an open identification signal 78 is received, then the process proceeds to step 436 where the open identification signal 78 is saved in an appropriate buffer for later processing. Next, at step 438 the base operator 34 listens for the close identification signal 78 generated by the mobile transmitter 70. Next, at step 440, upon completion of step 438, or if at step 434 the mobile open identification signal 78 has not been received, then the base operator 34 determines whether the close identification signal 78 has been received or not. If the close identification signal 78 is received, then at step 442 the mobile close identification signal 78 is saved in an appropriate memory buffer for later processing.

Upon completion of step 442, or if the mobile close identification signal is not received at step 440, the process continues to step 444 for the purpose of processing the identification signals whether they have been received or not. Accordingly, at step 446 the base operator controller 52 determines whether the open identification signal 78 has been received or not. In any event, if the open identification signal 78 is in the buffer, then at step 447, the controller 52 determines whether the failed open variable is greater than A' or not. If not, then process proceeds to step 460. However, if the failed open variable is greater than A', then at step 448 the controller 52 determines whether a close time-out function has elapsed or not. The close time-out function or timer, which has a predetermined period of time, is started after completion of a door close operation. In any event, if the close time-out function has elapsed, then at step 450 the controller 52 determines whether the last course of action was a door open movement. If the last course of action was not an open movement, then at step 452 the controller 52 queries as to whether a cancel signal has been received or not. If a cancel signal has not been received, then at step 454 the controller 52 inquires as to the status of the door position. If the door is closed, and not open, then at step 456 the base controller generates an open door move command at step 456. And then at step 458 an open time-out function is started and the variable failed open is reset. Upon completion of step 458 the process returns to step 432.

Returning to step 452, if a cancel signal has been received then the process immediately transfers to step 458, the open time-out function is started, and the process returns to step 432. It will be appreciated that in the present embodiment, the operator controller 52 may know the position of the door. This is by virtue of position detection mechanisms internally or externally associated with the base operator controller 34. In the event such position detection mechanisms are not available, then step 454 may be ignored as indicated by the dashed line extending from query 452 to command 456. In any event, if the door position, at step 454, is determined to be open, then step 456 is bypassed and at step 458 the open time-out function is started.

If at step 446 an open signal is not stored in the buffer, or at step 448 the close timer is not completed, or if at step 450 the last action was an open movement, then the process continues to step 460. At step 460 the controller 52 inquires as to whether the close signal buffer has a close signal retained therein. If a close signal has been received, then at step 462 the variable failed close is reset and the process returns to step 432. However, if at step 460 a close identification signal is not in the buffer, then the process proceeds to step 464. It will be appreciated that upon each completion of step 460, the close signal buffer is cleared. In any event, at step 464 the controller 52 inquires as to whether the open time-out function has elapsed or not. If not, then the process returns to step 432. If the open time-out function has elapsed at step 464, then at step 466 the controller 52 inquires as to whether the variable failed close is greater than a predetermined value A. This variable is utilized to prevent any false closings because of radio frequency interference, other signal interference, or null values. If the failed close variable is not greater than A, then at step 468 the failed close variable is incremented by one and the process returns to step 432. However, if at step 466 the failed close variable is greater than A, then the controller 52 makes an inquiry at step 470 as to whether the last course of action was a door close movement. If the last course of action was a door close movement, then the process returns to step 432. However, if at step 470 the last course of action was not a door close movement, then the process continues to step 472 to determine whether a cancel signal has been received or not. If a cancel signal has been received, then the close time-out function is started at step 478 and then the process continues on to step 432.

If a cancel signal has not been received at step 472, then the process proceeds to step 474 to determine whether the door position is closed or not. If the door position is not closed, then at step 476 a door close command is generated by the base controller 52 and then at step 478 the close time-out function is started. However, if the door position is closed, as determined at step 474, step 476 is bypassed and steps 478 and 432 are executed. If the controller 52 is unable to determine whether the door position is open or closed, then step 474 is bypassed and step 476 is executed.

From the foregoing descriptions it will be appreciated that if the door or barrier 12 is in a closed condition when the two identification signals arrive, the controller 52 sends a command to the motor controls to open the door 12 and start a time-out function to prevent the door from closing for a predetermined period of time regardless of any additional identification signals received. If the door 12 is determined to be open when the identification signals are received by the base receiver 56, the controller 52 will not send a command to the motor 60 until the controller 52 no longer receives a close identification signal. Once the door is closed in this scenario, the time-out function is initiated and the base controller 52 ignores any open identification signals received during the time-out function period. As a result, the base controller 52 will not allow an open door to close until the time-out function is complete, nor will a closed door be allowed to open until the time-out function is complete. The mobile transmitter 70 close identification signal must go out of range to close the door, thus the open identification signal will not be recognized until after the transmitter 70 has been out of range for a predetermined period of time. In other words, only the loss of the close signal after completion of the time-out function will result in closing the door, regardless of what the open signal is doing. And the loss of the open signal for the time-out function period must occur before receipt of an open signal will be acted upon by the base controller 52.

In the event the mobile transmitter 70 is connected to the accessory circuit of a carrying device 79, the mobile transmitter 70 will send identification signals as soon as key movement to an accessory or position is detected. In essence, turning the ignition on initiates the processing as set forth in FIGS. 9 and 10. In a similar manner, when the key of the carrying device 79 is moved to the off position, presumably when the carrying device 79 is in the enclosure 110, such as a garage, the normal processing by the base controller 52 will initiate a door close operation unless the door 12 has already been closed.

It will also be appreciated that the remote mobile transmitter 70 may be activated or manually turned on when one arrives closer to the destination so as to begin sending identification signals. Such a feature would also allow for further power savings on the mobile transmitter 70. In other words, if the person driving the carrying device is away from the base controller for an extended period of time, the transmitter can be turned off so as to prevent any battery drain.

FIG. 11 shows an alternative embodiment of the mobile transmitter and the base operator, designated generally by the numerals 70' and 34' respectively. The mobile transmitter 70' and base operator 34' are functionally and operationally equivalent to that discussed with respect to FIG. 2 of the present system 10, except that the mobile transmitter 70' includes a transceiver 600 in lieu of the emitter 76, and that the base operator 34' includes a base transceiver 602 in lieu of the base receiver 56. It will be appreciated that instead of the transceiver 600 replacing the original emitter 76, a stand alone receiver, in addition to the emitter, could also be connected to the processor 72 to perform the same functions to be described. Likewise, a stand alone base transmitter, in addition to the base receiver, could be connected to the controller 52 to perform the following functions. In any event, the present embodiment is configured to operate, and carry out the same functions and operational steps that were discussed above with respect to FIGS. 1-13 and provide additional functionality.

Specifically, the transceiver 600 allows the mobile transmitter 70' and the base operator 34' to have two-way communications between each other only for the purpose of learning the mobile transmitter 70' to the base operator 34'. The two-way communication allows both the base operator 34' and the mobile transmitter 70' to communicate in order to select a clear communication frequency to be used by the mobile transmitter 70' to send commands, via command signals, to the base operator 34'. Exemplary commands may comprise a barrier open/close command to actuate the barrier 12 between open and closed positions. Additionally, the two-way communication between the base operator 34' and the mobile transmitter 70' during the learning process may allow a suitable security code, or other data to be selected and stored. The security code ensures that only mobile transmitters 70' that have been properly learned with the base operator 34' are permitted to execute commands at the base operator 34'. For example, the security code used by the base operator 34' to identify a learned mobile transmitter 70' may be used to authenticate command signals sent therefrom. It should be appreciated that the security code may comprise a rolling code that may employ any suitable encryption algorithm.

Turning to FIG. 12, the operational steps taken by the mobile transmitter 70' and the base operator 34' during the learning process, or learn mode, are generally referred to by the numeral 610. It should be appreciated, however, that the steps discussed below may be performed in a somewhat different order, while still achieving the result of learning the mobile transmitter 70' to the base operator 34'. Initially, at steps 612 and 614 of the process 610, the learn mode of the remote transmitter 70' and the base operator 34' are respectively activated. The base operator 34' may be placed into the learn mode by depressing the learn button 59 on the controller 52, or in the case where the add-on processing device 65 is used, by depressing the learn button 59*x* on the add-on controller 69. Likewise, the mobile transmitter 70' may be placed in the learn mode by depressing the learn/door move button 82 on the mobile transmitter 70'. Other suitable ways of enabling learning of the remote transmitter 70' to the base operator 34' may be implemented. Once the learn mode is invoked at the base operator 34', the base operator 34' enters a receive mode at step 616, and listens via the base transceiver 602 for a learning signal/learning data that is sent by the mobile transmitter 70'. It should be appreciated that the learning data may be embodied in a wireless signal communicated between the mobile transmitter 70' and the base operator 34', and thus the use of the terms learning signal or learning data as used herein is meant to have substantially the same meaning.

Somewhat simultaneously with step 616, the mobile transmitter 70' enters a transmit mode, as indicated at step 618. During the transmit mode, the transceiver 600 of the mobile transmitter 70' initiates the transmission of the learning signal to the transceiver 602 of the base operator 34', as indicated at step 620. Upon the receipt of the learning signal/learning data by the base transceiver 602, the base operator 34' analyzes the signal to verify that the mobile transmitter 70' is in the learn mode, as indicated at step 622 of the process 610. At step 624, if the base operator 34' determines that the mobile transmitter 70' is in the learn mode, the base operator 34' proceeds to transmit a first acknowledge (ACK) signal, along with the learning data that includes the desired operating frequency that the base operator 34' has selected for communications with the mobile transmitter 70'. Next, at step 626, the mobile transmitter 70' enters a receive mode and listens for the first acknowledge (ACK) signal, and the learning data sent by the base operator 34'. If the mobile transmitter 70' receives the first acknowledge (ACK) signal and the learn data transmitted by the base operator 34', the mobile transmitter 70' transmits a second acknowledge (ACK) signal back to the base operator 34', as indicated at step 628. At step 630, the base operator 34' listens for the second acknowledge signal sent by the mobile transmitter 70'. If at step 632, the base operator 34' receives the second acknowledge (ACK) signal from the mobile transmitter 70', the base operator 34' stores the learn data to the memory 74 at step 632. In addition, the base operator 34' switches to the quiet communication frequency that is to be also utilized by the transmitting portion of the transceiver 600 of the mobile transmitter 70'. Correspondingly, the mobile transmitter 70' stores the learn data received from the base operator 34' in its memory 54, and switches to the same quiet communication frequency that was selected by the base operator 34' at step 634. Thus, once the communication frequency has been established, the base operator '34 is prohibited from sending communication signals or data to the mobile transmitter 70'. In other words, all other communications, except for the learning process, are one-way from the mobile transmitter 70' to the receiving portion of the base transceiver 602 during an operate mode. Thus, the mobile transmitter 70' can continue to transmit various signals needed, such as the mobile signal, and to transmit any associated data to the base operator 34' in order to effect the functions of any of the embodiments disclosed herein.

As indicated in the preceding discussion, by replacing the emitter 76 as shown in FIG. 2 with the transceiver 600, the selection of a clear communication frequency is improved. Thus, the end user simply initiates the learn mode on both the mobile transmitter 70' and the base operator 34' and the system automatically identifies and selects the clearest communication frequency or channel to use for subsequent one-way communications from the transmitter to the base. As such, the user is spared the time and aggravation of manually selecting a quiet communication frequency for the base operator 34 and the mobile transmitter 70 to share.

Based upon the foregoing, one advantage of the power conserving mobile transmitter is that it utilizes a motion detector, such as an accelerometer, to determine whether a carrying device, such as a vehicle, is moving. Power conservation is accomplished by limiting generation of the open/close signals 78 to only when the motion detector detects movement and/or acceleration of the transmitter which may or may not be situated in a carrying device. Another advantage of the power conserving mobile transmitter is that the mobile transmitter is activated only after the accelerometer has detected that the carrying device has moved, and deactivated when the carrying device has stopped moving. Still another advantage of the power conserving mobile transmitter is that the accelerometer detects motion along single or multiple axes.

Thus, it can be seen that the objects of the invention have been satisfied by the structure and its method for use presented above. While in accordance with Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

The invention claimed is:

1. A system for controlling an access barrier comprising:

a base operator to actuate the access barrier, said base operator adapted to communicate learning data only in a learn mode and receive operational data only when in an operate mode; and at least one hands-free mobile transmitter including a motion detector and a transceiver, said transceiver adapted to communicate learning data only when in said learn mode and transmit operational data only when in said operate mode, said at least one mobile transmitter and said base operator being learned to each other by exchanging learning data in said learn mode;

said motion detector comprising an accelerometer which detects movement of said at least one hands-free mobile transmitter; and said at least one hands-free mobile transmitter only transmitting operational data to be received by said at least one hands-free mobile base operator to actuate the access barrier when said transmitter records acceleration values in at least two different axes, then sleeps for a predetermined period of time, then awakens to detect a first change of acceleration in at least one axis of motion from said recorded acceleration values and then confirms a second change of acceleration in at least one axis of motion the same as or different than detected at said first change of acceleration.

2. The system according to claim 1, wherein said base operator includes a base transceiver.

3. The system according to claim 1, wherein said learning data includes a communication frequency selected by said base operator.

4. The system according to claim 1, wherein said learning data comprises a security code.

5. The system according to claim 4, wherein said security code comprises a rolling code.

6. The system according to claim 1, wherein the exchange of said learning data results in the selection of a communication frequency for use by said base operator and said at least one mobile transmitter.

7. An operator system for automatically controlling access barriers, comprising:

a base controller associated with at least one access barrier;

at least one base transceiver associated with said base controller; and at least one hands-free mobile transmitter including a motion detector and a transceiver, said motion detector comprising an accelerometer which detects movement of said at least one hands-free mobile transmitter, said at least one mobile transmitter automatically and periodically generating dual identification mobile signals for receipt by said base controller when said accelerometer detects a change in acceleration, said dual mobile identification signals include an open identification signal and a close identification signal, said base controller configured to receive said dual identification mobile signal, and said base controller and said at least one mobile transmitter adapted to exchange learning data between each other in a learn mode, so as to be learned to each other;

wherein if said at least one mobile transmitter and said base controller are learned to each other, said dual identification mobile signals are detectable by said at least one base transceiver, said base controller selectively generating barrier movement commands depending upon whether said open and close identification signals are received or not, and wherein said at least one hands-free mobile transmitter only transmits said open and close identification signals when said at least one hands-free mobile transmitter first records acceleration values in at least two different axes, then sleeps for a predetermined period of time, then awakens to detect a first change of acceleration in at least one axis of motion from said recorded acceleration values and then confirms a second change of acceleration in at least one axis of motion the same as or different than detected at said first change of acceleration.

8. The operator system according to claim 7, wherein said learning data comprises a security code.

9. The operator system according to claim 8, wherein said security code comprises a rolling code.

10. The operator system according to claim 7, wherein said a communication frequency is selected during the exchange of said learning data in said learn mode.

* * * * *